Feb. 26, 1963 H. GROSNICKLE, JR., ET AL 3,079,145
RECORD MEMBER FEEDING DEVICE
Filed Oct. 30, 1958 9 Sheets-Sheet 1
FIG. I
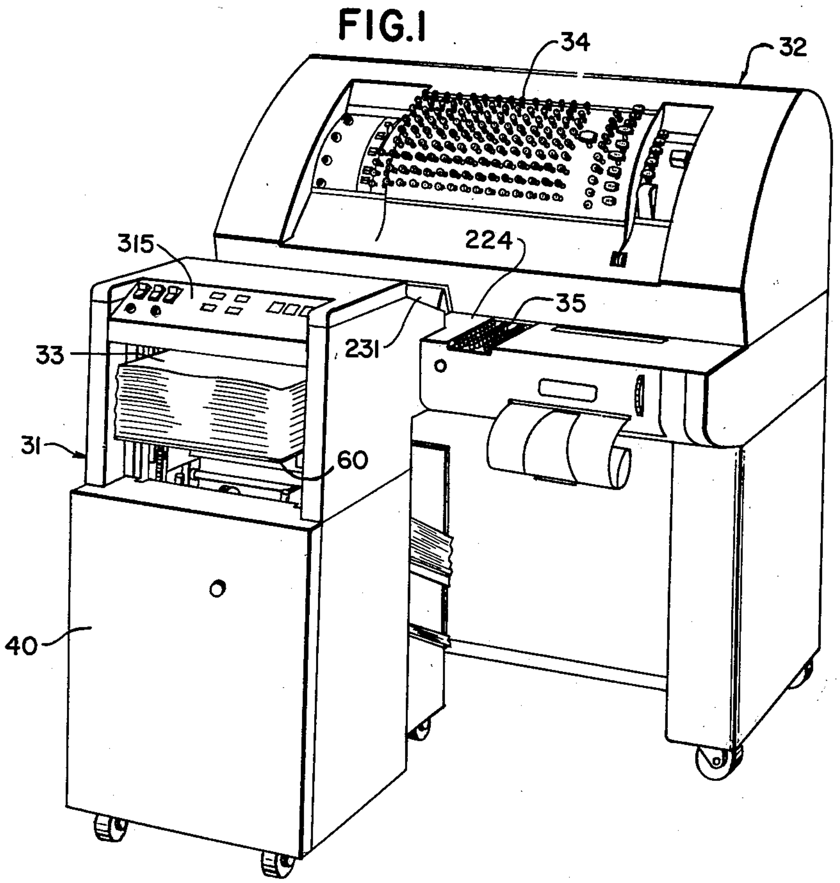
FIG. II
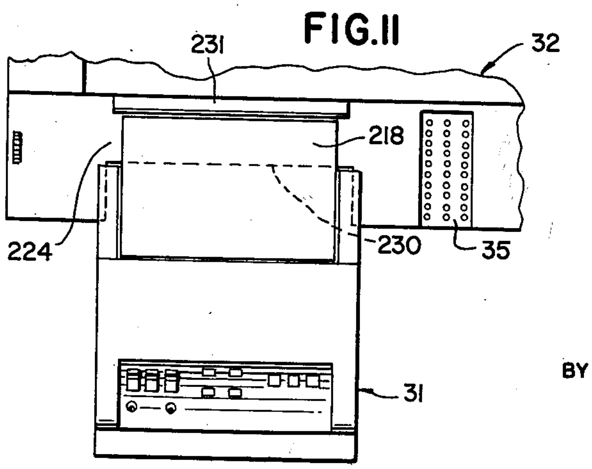
INVENTORS
HENRY GROSNICKLE JR.
WILLIAM C. ARNOLD
BY Louis A Kline
Albert L Sessler Jr
THEIR ATTORNEYS Feb. 26, 1963 H. GROSNICKLE, JR., ETAL 3,079,145

RECORD MEMBER FEEDING DEVICE

Filed Oct. 30, 1958

9 Sheets-Sheet 2

INVENTORS
HENRY GROSNICKLE JR.
WILLIAM C. ARNOLD

BY Louis A Kline
Albert L Sessler, Jr.
THEIR ATTORNEYS

Feb. 26, 1963 H. GROSNICKLE, JR., ETAL 3,079,145

RECORD MEMBER FEEDING DEVICE

Filed Oct. 30, 1958

9 Sheets-Sheet 3

INVENTORS
HENRY GROSNICKLE JR.
WILLIAM C. ARNOLD

BY Louis A. Kline
Albert L. Sessler, Jr.
THEIR ATTORNEYS

Feb. 26, 1963 H. GROSNICKLE, JR., ETAL 3,079,145

RECORD MEMBER FEEDING DEVICE

Filed Oct. 30, 1958 9 Sheets-Sheet 4

INVENTORS
HENRY GROSNICKLE JR.
WILLIAM C. ARNOLD

BY Louis A. Kline
Albert L. Sessler, Jr.
THEIR ATTORNEYS

INVENTORS
HENRY GROSNICKLE JR.
WILLIAM C. ARNOLD
BY Louis A Kline
Albert L. Sessler, Jr.
THEIR ATTORNEYS INVENTORS
HENRY GROSNICKLE JR.
WILLIAM C. ARNOLD
BY Louis A. Kline
Albert L. Sessler, Jr.
THEIR ATTORNEYS INVENTORS
HENRY GROSNICKLE JR.
WILLIAM C. ARNOLD
BY Louis A. Kline
Albert L. Sessler, Jr.
THEIR ATTORNEYS INVENTORS
HENRY GROSNICKLE JR.
WILLIAM C. ARNOLD
BY Louis A Kline
Albert L. Sessler, Jr.
THEIR ATTORNEYS

RECORD MEMBER FEEDING DEVICE

Filed Oct. 30, 1958

INVENTORS
HENRY GROSNICKLE JR.
WILLIAM C. ARNOLD

BY Louis A. Kline
Alfred L. Sessler, Jr.
THEIR ATTORNEYS

United States Patent Office 3,079,145
Patented Feb. 26, 1963

3,079,145

RECORD MEMBER FEEDING DEVICE

Henry Grosnickle, Jr., and William C. Arnold, Dayton, Ohio, assignors to The National Cash Register Company, Dayton, Ohio, a corporation of Maryland Filed Oct. 30, 1958, Ser. No. 770,673
14 Claims. (Cl. 271—5)

This invention relates to a record member feeding device, and more particularly relates to a record member feeding device for accounting machines, in which the feeding is accomplished automatically by the device in response to control signals from the accounting machine.

The increasing amount of paper work required to be handled in almost all types of commercial establishments has created considerable demand for mechanical accounting devices which are capable of rapid, accurate account-keeping and which require the attendance of a minimum number of human operators. This is particularly true in the banking field, where a very large volume of checks and deposits must be handled during each accounting period for each checking account of the bank. A recent development in accounting machines particularly suited for bank applications is a machine which is capable of utilizing ledger cards having magnetically coded information thereon, and which can pick up the magnetically coded information from the ledger card when the ledger card is inserted into the machine, without the necessity for manual entry of this data by a machine operator. This machine represents a considerable advance in bank accounting procedures, and enables a very considerable saving in time and number of operators to be had. It is the purpose of this invention to provide a feeding device which is capable of automatically feeding the ledger cards into the accounting machine without the necessity of any human assistance, so that certain operations, such as trial balance and transfer operations, may be performed by the feeding device in conjunction with the accounting machine without the need for any human intervention or assistance. Of course it will be obvious that a feeding device such as the one which forms the subject of this invention is capable of other uses in addition to its use with an accounting machine in bank accounting operations, and it is therefore to be understood that the illustrative use in which the novel feeding device of the present invention is shown herein is not to be deemed as limiting the present invention in any way.

Accordingly, it is an object of the present invention to provide a feeding device for automatically feeding record members to a utilizing device.

A further object is to provide a record member feeding device for use in conjunction with an accounting machine, and capable of feeding record members to the accounting machine in response to the control signals from said machine.

An additional object is to provide a record member feeding device for use in conjunction with an accounting machine, said feeding device including means for actuating the accounting machine as the card is fed thereto.

Another object is to provide a record member feeding device for use in conjunction with an accounting machine, said feeding device being capable of receiving the record members after they are operated upon by the accounting machine and ejected therefrom, and said feeding device having a number of different receptacles for receiving the record members operated upon, and being capable of selecting the correct receptacle for the different record members according to control signals from the accounting machine.

Still another object is to provide a record member feeding device having checking means to prevent improper feeding of record members from the device.

With these and other objects, which will become apparent from the following description, in view, the invention includes certain novel features of construction and combinations of parts, a preferred form or embodiment of which is hereinafter described with reference to the drawings which accompany and form a part of this specification.

Of said drawings:

FIG. 1 is a perspective view of the novel machine embodying the invention, shown in operative relation to an accounting machine.

FIG. 11 is a fragmentary plan view showing the record member feeding device and the accounting machine in cooperative relation.

Figure 2:
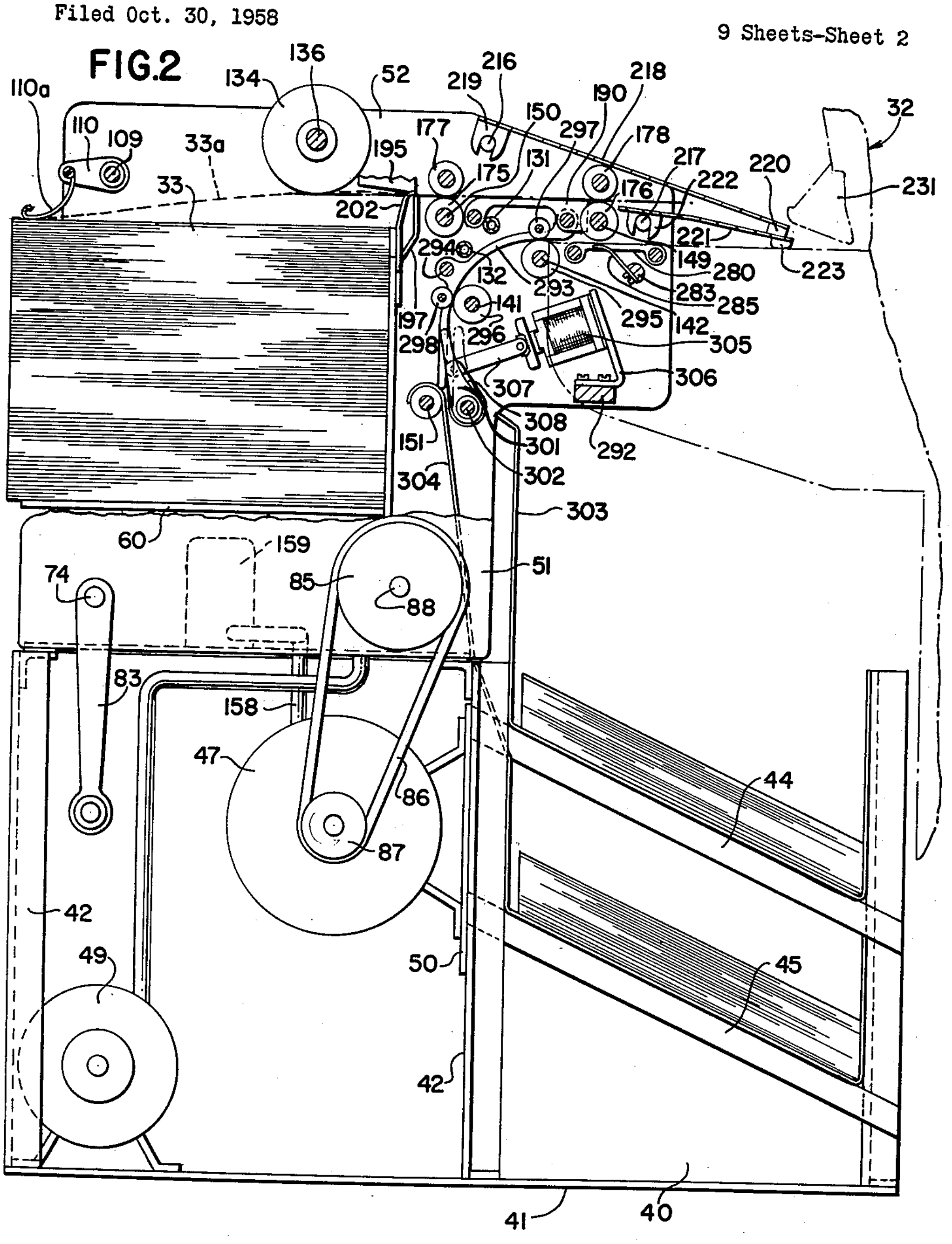
FIG. 2 is a side elevation, partly broken away, of the upper portion of the record member feeding device.

FIGS. 13 to 17 inclusive are circuit diagrams showing various control circuits used in operation of the feeding device.

In FIG. 1, the novel feeding device or feeder 31 is shown in operative relation with an accounting machine 32. In order to explain clearly the construction and operation of the feeding device of the present invention, it is considered desirable first to describe briefly the functioning of the accounting machine 32 with which the feeding device is associated in the present embodiment.

The accounting machine 32 is controlled in part by the ledger cards 33, shown in stacked formation in the feeding device 31. On the ledger cards 33 are printed the usual amounts pertaining to the account, such as the checks and deposits, the balances after each transaction entry, the check count, the sign of the balance, the date, etc., and, in addition, the card has recorded thereon magnetically the last balance and related data, such as the account number, the sign of the balance, the check count, and the number of the line on which the next entry is to be printed on the ledger card. The accounting machine is also controlled from a keyboard 34, on which data may be entered to be printed on the card and may be combined with data read from the card to form new balances. In a new balance recording operation, the data pertaining to the new balance is printed on the ledger card 33; the previous magnetically stored data is erased; and the new balance and related data pertaining to the new balance are magnetically stored on the card in its place.

In addition to the usual interlocks which have previously been provided on bank posting machines, the accounting machine is provided with further safeguards to insure correctness of the pickup operation. One of these safeguards is a check to be sure that all of the data has been read from the card. Failure to read any data will prevent the entry of the remaining data into the machine and will cause the card to immediately be fed from the machine.

Another of these safeguards is a check to be sure that the data which was read has been correctly entered into the machine by comparing the data actually set in the machine with the data actually recorded on the card. This is accomplished by first reading the ledger card and controlling the setting of the machine according to the data which was read, and then reading the card a second time and comparing the second reading with the actual setting of the machine. If there is no agreement, the further normal operation of the machine is prevented, and only a corrective operation of the machine may take place.

A further safeguard cooperates with the above two to insure that overprinting on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in printing position.

The accounting machine is provided with a further safeguard to insure correctness of entries. An account number keyboard 35 is provided, on which the account number may be set, and the account number thus set up can be compared with the account number read from the ledger card to insure that the check for the deposit is being posted to the correct account. Failure of the account numbers to agree will cause the card to be fed from the machine immediately and will prevent the data from being entered into the machine.

These automatic safeguards and checking means, together with the usual interlocks and controls, insure virtually "errorproof" operations without the necessity of running proofs on work already performed.

The accounting machine is provided with a data storage means, in which the balance and the check count are stored when they are read and are retained until it is determined that something has been read from each channel on the card and that there has been an agreement between the account number read from the card and that set in the account number keyboard 35. If data was read from each channel on the card, and if the account numbers agree, then the balance and the check count are entered into the totalizer and counter of the machine under control of the data storage means. If there is a failure to read the data from any channel on the card, or if the account numbers do not agree, the card is immediately fed from the machine, as indicated above, and the balance and the check count are not entered into the totalizer and the counter of the machine. By thus storing the balance and the check count until it is determined that data has been read from all of the channels on the card and until it is determined that there is agreement between the account numbers, incorrect entries and corrective operations of the machine are minimized.

This storage of balance and check count until the account number agreement has been determined also enables a "stop payment" signal to be obtained to call the operator's attention to the fact that a "stop payment" order has been placed on the account, and to enable the operator to examine the check, before entries are made into the totalizer and the counter, to see whether it is the one on which the "stop payment" was placed. This is accomplished by recording a "stop payment" number on the ledger card instead of its account number, so that the account number comparing mechanism will show a failure of comparison and prevent the entry of the balance whenever it is attempted to post to the account in the usual manner. Upon verification that the check is not the one against which the "stop payment" order has been placed, it may be posted by setting the "stop payment" number in the account number keyboard 35 and operating the machine in the usual manner. In this manner, the posting of a check upon which a "stop payment" order has been placed is prevented.

The accounting machine is also provided with extremely flexible controls which enable it to perform different types of operations involving reading and recording operations on the cards. For example, with one setting of the controls, the card-reading operation may be eliminated, and data may be set up on the keys of the machine and recorded magnetically on the card; with another setting of the controls, a normal posting operation may take place involving the reading of the card to pick up the old balance, the entering of checks and/or deposits by operating the machine under control of the keys, and the recording of the new balance on the card; with a further setting of the controls, the machine may be controlled to transfer certain stored data from one card to another, as at the end of the month or accounting period or when a ledger card has been filled, and in this operation data is read from a card and set up in the machine, the old card is removed from the machine and a new card put in the machine, and certain of the data which was read is recorded on the new card; and, with a still further setting, the controls are effective to cause the machine to operate in a trial balance operation, in which the stored data is read, the old balance and the check count are entered into the machine, and the card is ejected without erasure of the stored data or the recording of any further data thereon. For a further, more detailed description of the construction and operation of this accounting machine, reference may be had to United States patent application Serial No. 610,754, filed September 19, 1956, by Konrad Rauch et al., inventors, now United States Patent No. 2,947,475, issued August 2, 1960.

The feeding device 31 of the present invention is capable of being moved into and out of an operative relation with the accounting machine 32, since the normal posting operations for which the accounting machine is designed, utilizing the keyboards 34 and 35, will be performed without the feeding device 31 being in operative relation to the machine 32 in the present disclosed embodiment. As has been previously stated, the feeding device 31 will be utilized in conjunction with the accounting machine 32 during operations such as trial balance operations and transfer operations, in which no keyboard entries need be made using the keyboards 34 and 35, and in which the feeding device 31 and the accounting machine 32 may operate completely automatically with no need for a human operator.

DETAILED DESCRIPTION

*Machine Housing and Framework*

The card feeder of the present invention, as best shown in FIGS. 1 and 2, is provided with a housing 40 supported by a plurality of frame members including a base 41 and upright supports 42. Upper and lower bins 44 and 45, respectively, are located in the front portion of the housing 40 and serve to collect ledger cards in preselected groups after they have been ejected from the accounting machine, as will presently be described.

Immediately to the rear of the bins 44 and 45 is a space in which are housed the motors and pumps for the pressure and vacuum systems employed in the feeder. These include a vacuum pump 46 (FIG. 5), a motor 47 (FIGS. 2 and 5) for driving the pump 46 and also used for driving the various feed rollers, an air pump 48, and a motor 49 for driving the air pump. The pump 48 and the motor 49 are secured to the base 41, while the pump 46 and the motor 47 are secured to a member 50 fixed to the support members 42.

Directly above the space used for housing the pumps and motors of the feeder are the card supply and feeding mechanisms. These mechanisms are supported by side frames 51 and 52 (FIGS. 2, 3, 4, and 5), which in turn are interconnected by a plurality of rods and tie bars, such as the bars 53 and 54.

*Card Supply Means*

A table 60 (FIGS. 1, 2, 3, 4, and 6) is provided for holding a stack of ledger cards 33, and for moving the stack upwardly as cards are fed by the feeding means, so that the top card of the stack is always in proper position to be fed. The table 60 is positioned between the side frames 51 and 52, and is supported by the means which control its vertical movement. Fixed to the under side of the table at either side by screws 61 are blocks 62 (FIGS. 5 and 6). Fixed to the outer side of each block 62 is a leg 63 carrying rollers 64 arranged to ride in the track 65 of a vertical rail 66. The rails 66 are secured to the side frames 51 and 52. Fastened to the inner side of each block 62 is a rack 67 having thereon teeth 68 arranged to mesh with the teeth of a driving gear 69 fixed to a shaft 70 journaled in the side frames 51 and 52. Spacer blocks 71 (FIG. 6) are secured between respective racks and legs to maintain said racks and legs in proper position.

Also fixed to the same shaft 70 on which the two driving gears 69 are secured is a gear 72, which meshes with a pinion 73 fixed to a shaft 74 journaled in the side frames 51 and 52. Also fixed on the shaft 74 is a ratchet wheel 75, and free on the shaft 74 adjacent to the ratchet wheel is a ratchet plate 76 having pivoted thereon a feed pawl 77, which is urged into engagement with the teeth on the ratchet wheel 75 (FIGS. 4 and 7) by a spring 78. A retaining pawl 79, pivoted on a bracket 80 secured to a base member 81 extending between the side frames 51 and 52, is urged into engagement with the teeth of the ratchet wheel 75 by a spring 82.

Two separate means are provided for driving the table in a vertical direction. The first of these means consists of a crank 83 (FIG. 2), which is secured to a portion of the shaft 74 which extends through the side frame 51 and to the exterior of the housing 40. This permits manual movement of the table 60 in a manner which will subsequently be described.

The second operating means for the table 60 utilizes power from the constantly-operating motor 47. A pulley 85 (FIGS. 2, 4, and 5) is operatively connected by a belt 86 to a smaller pulley 87 fixed on the shaft of the motor 47. The pulley 85 is fixed on a shaft 88, which is journalled in the side frames 51 and 52. A gear 89, also fixed on the shaft 88, operates through a series of reduction gears 90, 91, and 92, the gears 90 and 91 being fixed on a shaft 93 journaled in the side frames 51 and 52, and the gear 92 being secured on a shaft 94 journaled in the side frames 51 and 52, to drive the shaft 94 and a cam 95 fixed thereon.

The cam 95 is arranged to cooperate with a roller 96 mounted on a pitman 97, which is slotted at one end to ride on the shaft 94 and is pivoted at its other end to the ratchet plate 76. The pitman 97 is normally urged to the left, as viewed in FIGS. 4 and 5, by a spring 98 secured to said pitman and to a post 99 fixed to the base member 81.

Secured to the pitman 97 near the end of said pitman which is pivoted to the ratchet plate 76 is a stop 100, which is arranged to cooperate with two shoulders 101 and 102 of a slot 103 formed in the end of an arm 104 secured to a shaft 105. The shaft 105 is journaled in the side frames 51 and 52, and has also secured thereto, at a position outside the side frames 52, an arm 106. The arm 106 is connected by means of a link 107 to an arm 108 (FIGS. 3 and 4) secured to a shaft 109 journaled in the side frames 51 and 52.

Also secured to the shaft 109 near its midpoint is an arm 110 having fixed to its free end a feeler 110*a*. The feeler 110*a* is positioned to coact with the top card 33 of a stack of ledger cards positioned on the table 60 when the stack of cards is moved up past a certain elevation by said table, for control of the movement of the table, as will subsequently be described.

Means are provided for shifting the feed pawl 77 and the retaining pawl 79 out of operative engagement with the ratchet wheel 75 to permit the table 60 to be returned in a downward direction. This means comprises a lever 111 (FIGS. 4, 5, and 7) pivoted by means of a stud 112 on the bracket 80. The lever 111 is provided at one end with a key tip 113 to enable said lever 111 to be manually operated, and, on the other side of the pivot 112, the lever 111 is provided with an arcuate cam surface 114 for engagement with studs 115 and 116 on pawls 77 and 79, respectively. It will be seen that clockwise movement of the lever 111, as viewed in FIG. 7, by depression of the key tip 113, will cause the cam surface 114 to engage the studs 115 and 116 on the pawls 77 and 79 and will thereby disengage said pawls from the teeth of the ratchet wheel 75. This frees the ratchet wheel, and the table 60, for movement of said table in a downward direction. A stud 117, projecting from the upper end of the post 99 (FIG. 4), functions as a stop to limit the downward movement of the table 60.

The manner in which the table 60 is operated to supply ledger cards 33 to the feeding mechanism of the card feeder of the present invention will now be described. As has been stated, the table 60 may be operated in either one of two ways, manually, by use of the crank 83, or automatically, by the constantly-operating motor 47, as controlled by the feeler 110*a* for limiting of the upward movement of the table 60 in accordance with the size of the stack of cards 33 positioned thereon.

When commencing operation of the card feeder, it is often desirable to adjust the position of the table 60 manually by use of the crank 83, since this may be accomplished more quickly than if the machine were caused to position the table automatically. This may be accomplished simply by turning the crank 83 in a clockwise direction, as viewed in FIG. 2, the desired extent, so that the table 60 is positioned in the proper position. The movement of the crank 83 is transmitted through the shaft 74, the pinion 73, the gear 72, and the shaft 70 to the two gears 69, which are arranged in coacting relationship with the two racks 67 secured to the table 60, through the blocks 62. During this movement, the retaining pawl 79, pivoted on the bracket 80, and the feed pawl 77, pivoted on the plate 76, merely ratchet over the teeth of the ratchet wheel 75 on the shaft 74, and do not impede the rotation of said shaft. Once the crank has been turned to the desired extent, the shaft 74, and therefore the shaft 70 and the table 60, are retained in proper position by the coaction of the retaining pawl 79 with the teeth on the ratchet wheel 75, since the pawl 79 is of the well-known "one way" type, permitting the ratchet wheel 75 to rotate in a clockwise direction, as seen in FIG. 4, but preventing rotation of the ratchet wheel 75 in a counter-clockwise direction.

Figure 4:
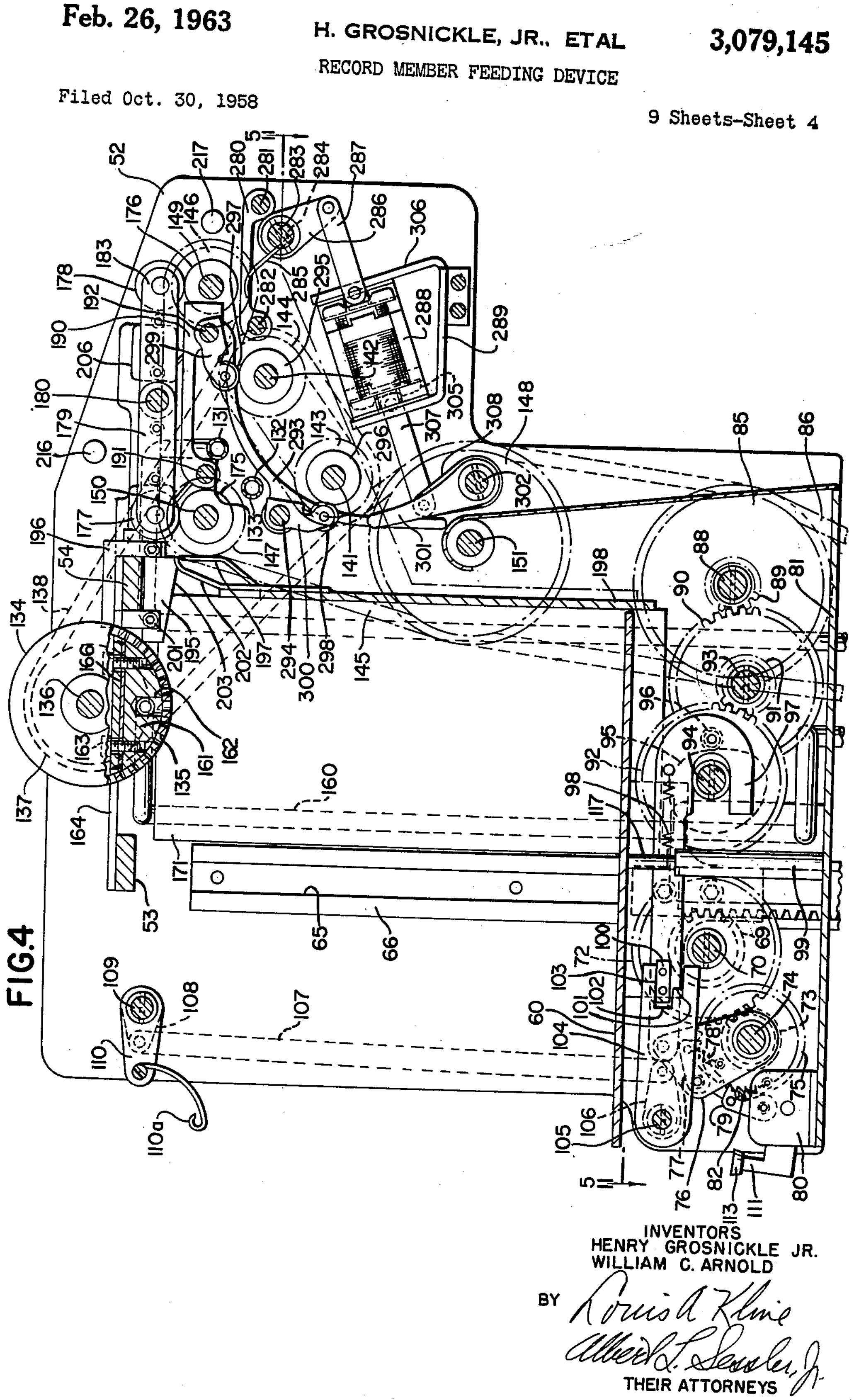
FIG. 4 is a sectional side view of the record member feeding device, taken along line 4—4 of FIG. 3.
Figure 5:
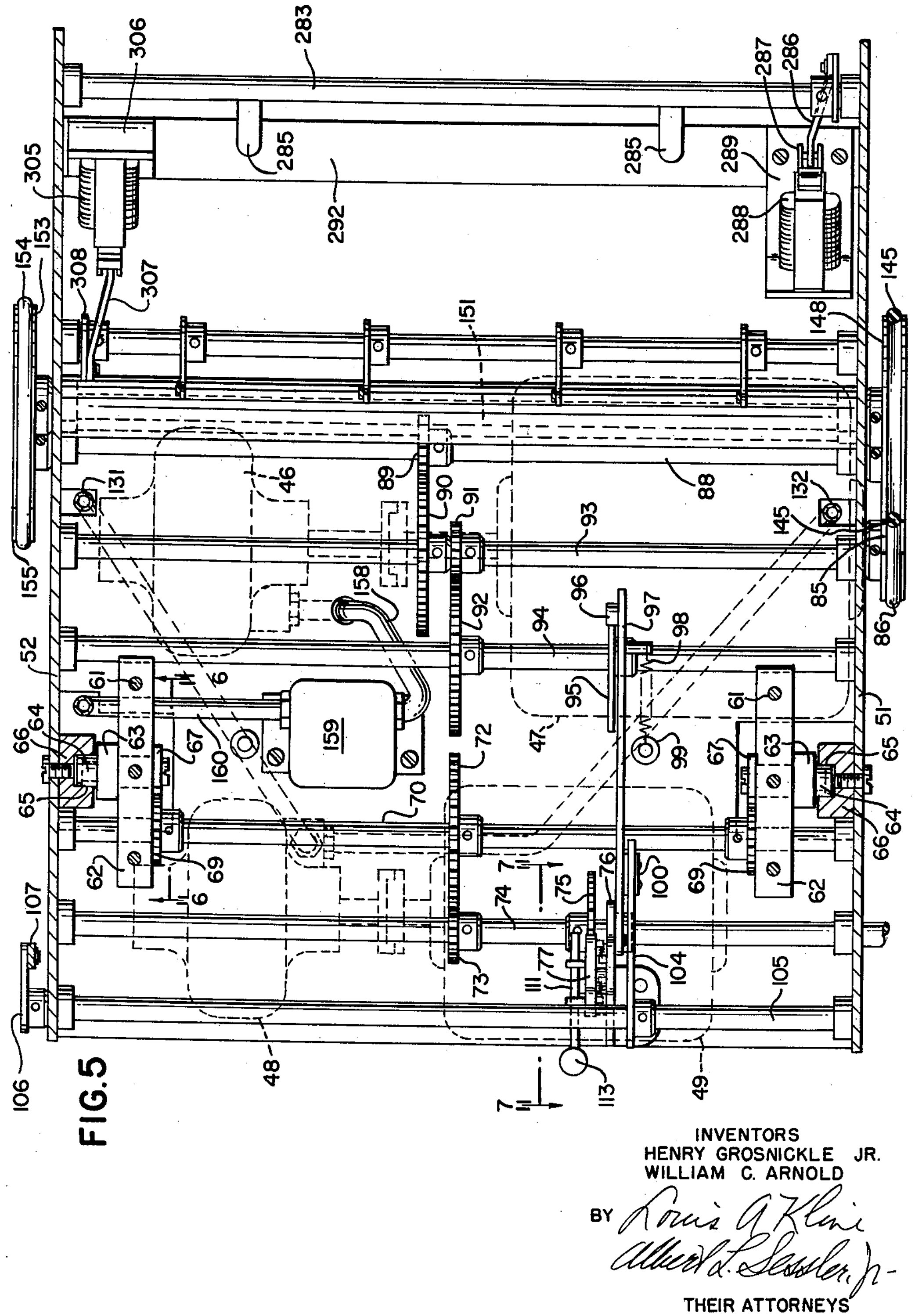
FIG. 5 is a sectional view through the record member feeding device, taken along line 5—5 of FIG. 4.
Figures 6, 7, 8, 9:
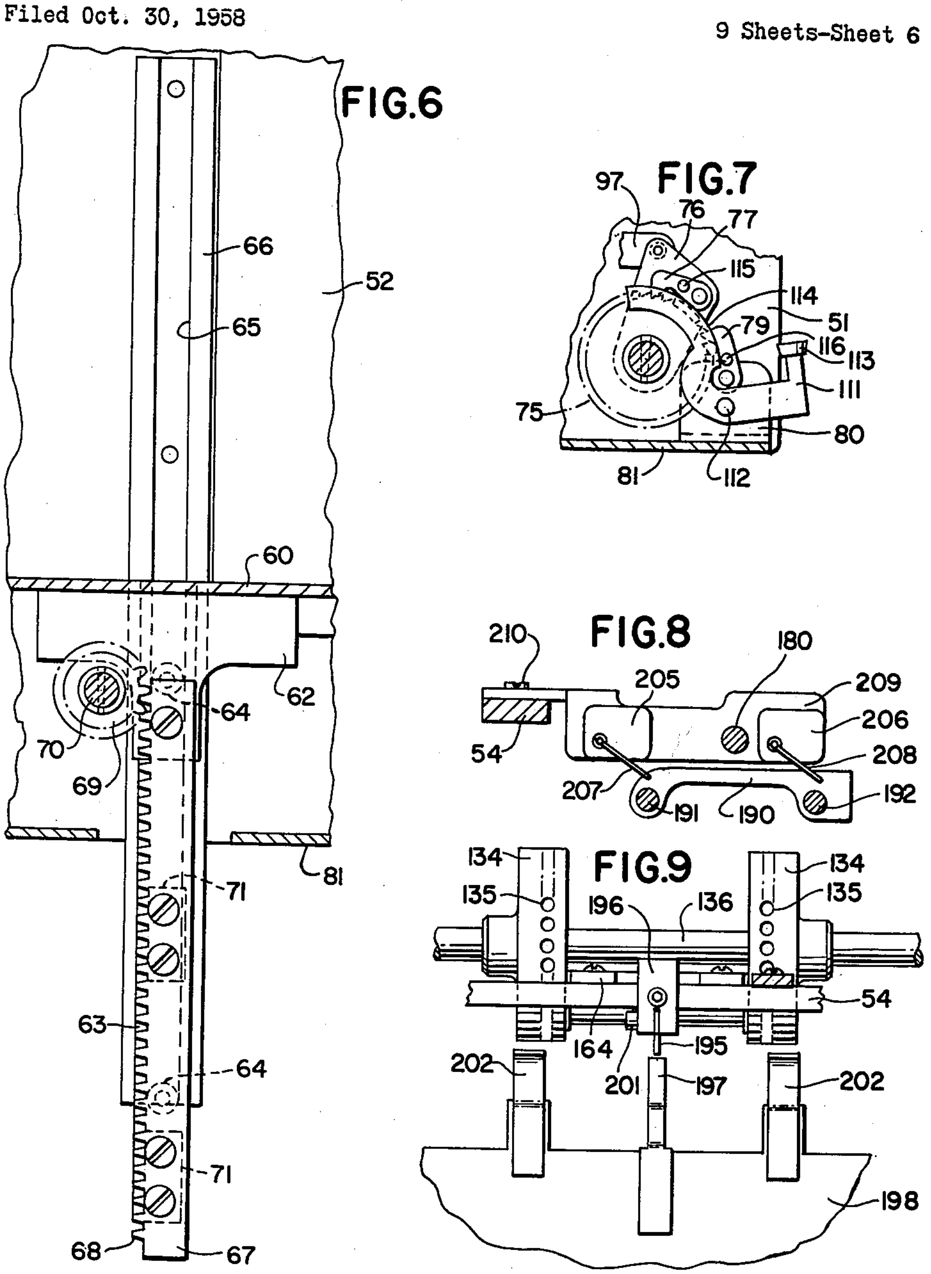
FIG. 6 is a fragmentary section of the device, taken along line 6—6 of FIG. 5.
FIG. 7 is a fragmentary sectional view of the device, taken along line 7—7 of FIG. 5.
FIG. 8 is a fragmentary sectional view of the device, taken along line 8—8 of FIG. 3.
FIG. 9 is a fragmentary sectional view of the card gauge, taken along line 9—9 of FIG. 3.

In the automatic operation of the table 60, power is transmitted from the motor 47 through the pulley 87, the belt 86, the pulley 85, and the gear train 89, 90, 91, and 92 to the cam 95 (FIGS. 4 and 5). This cam, by engagement wtih the roller 96 on the pitman 97, imparts regularly excursioned movement to said pitman, and to the plate 76, to which the pitman is pivoted at one end. The feed pawl 77, which is pivoted to the plate 76 and urged into engagement with the ratchet wheel 75 by the spring 78, causes the ratchet wheel 75 to be fed one step in a clockwise direction for each of the regularly excursioned movements of the pitman 97, while the retaining pawl 79 acts to prevent backward slippage of the wheel 75 during the return movement of the pawl 77 in each complete movement of the ptiman 97.

Movement of the ratchet wheel 75 in a clockwise direction by the pawl 77 is transmitted through the shaft 74, the pinion 73, the gear 72, and the shaft 70 to the two gears 69 cooperating with the racks 67 secured to the table 60 through the blocks 62, and the table 60 is thereby caused to move in an upward direction.

The feeler 110a acts to limit the upward movement of the table 60, so that the top card 33 of the stack of ledger cards thereon will always be in proper position to be carried by the feeding mechanism of the card feeder into the accounting machine with which it is associated. As the table and the stack of cards 33 thereon move upwardly, the top card will contact the feeler 110a, as shown in FIG. 2, and will cause said feeler, the arm 110, and the shaft 109 to be rotated clockwise, as viewed in FIG. 2. This movement will be transmitted through the link 107 (FIG. 4), the arm 106, and the shaft 105 to the arm 104, shifting the arm 104 so that the shoulder 101 rather than the shoulder 102 of the slot 103 is positioned in the path of movement of the stop 100 on the pitman 97. It will be seen in FIG. 4 that when the shoulder 102 is positioned opposite the stop 100, said stop has freedom to move, together with the pitman 97, the full extent of movement permitted by the cam 95, under the influence of the spring 98. However, when tthe shoulder 101 is brought into the path of movement of the stop 100, the extent of movement to the left, as seen in FIG. 4, of the pitman 97 under the influence of the spring 98 is limited by the engagement of the end of the stop 100 with the shoulder 101 on the arm 104. The pitman 97 is thus unable to rock the ratchet plate 76, and the feed pawl 77 on said plate can therefore not engage the next tooth of the ratchet wheel 75 to advance said wheel another step. The upward movement of the table 60 with the stack of cards thereon is thus terminated until such time as sufficient cards 33 have been taken from the top of the stack by the feeding mechanism of the card feeder to permit the feeler 110a and the arm 110 attached thereto to rock in a counter-clockwise direction sufficiently to shift the arm 104 so that the shoulder 102 of the slot 103 is again positioned opposite the stop 100 on the pitman 97. The pitman 97 is then free to operate to the full extent of its movement once more, and will rock the ratchet plate 76 sufficiently to cause the feed pawl 77 to feed the ratchet wheel 75 another step and thus raise the table 60.

When it is desired to lower the table 60, as, for example, to place a new stack of cards 33 thereon, the pawls 77 and 79 must be disengaged from the ratchet wheel 75. As has been previously described, this may be accomplished by depression of the key tip 113, which will operate the lever 111 to cause the cam surface 114 thereon to engage the studs 115 and 116 on the pawls 77 and 79 to shift said pawls out of engagement with the ratchet wheel 75. The table 60 is then free to move downward under the influence of gravity or manual pressure thereon to the desired extent, after which the pressure on the key tip 113 may be released to permit the pawls 77 and 79 to return to engagement with the teeth of the ratchet wheel 75 to retain the table 60 in the selected position, and to permit further upward movement thereof.

*Card Feeding Mechanism*

In order to feed the cards from the stack on the table 60, they must first be separated, and the topmost card 33 must be brought into actual engagement with the feeding means. This is accomplished by means of air pressure directed at the top few cards of the stack from two perforated tubes 131 and 132 (FIGS. 2, 3, 4, and 5) extending transversely from the side frames 51 and 52, and having the perforations 133 therein located so as to direct a stream of air toward the leading edges of the stacked cards 33. The tubes 131 and 132 are connected to the air pump 48, which is constantly driven by the motor 49. A constant stream of air is thus directed from the perforations 133 in the tubes 131 and 132 toward the stacked cards 33 for fluttering and separating these cards.

This stream of air is also effective to shift the topmost few cards of the stack to the dotted-line position indicated in FIG. 2 as 33a, in which the topmost card is in contact with the periphery of a pair of perforated driving cylinders 134, both of which are provided with a plurality of apertures 135 along their peripheries. The two cylinders 134 are fixed to a shaft 136, which is journaled in the side frames 51 and 52.

Means are provided for driving the cylinders 134 and the shaft 136, said means including a pulley 137 also fixed to the shaft 136 and a belt 138, which engages the pulley 137 and additional pulleys 139 and 140. The pulleys 139 and 140 are fixed on shafts 141 and 142, respectively. The shafts 141 and 142 are journaled in the side frames 51 and 52, and the pulleys 139 and 140 are fixed thereon to the outside of the side frame 52. Additional pulleys 143 and 144 are fixed to the shafts 141 and 142, respectively, to the outside of the side frame 51. A belt 145 (FIGS. 3, 4, and 5) engages the pulleys 143 and 144 as well as additional pulleys 146, 147, and 148, said last three pulleys being secured, respectively, to shafts 149, 150, and 151 extending transversely of the side frames 51 and 52, and being journaled therein.

To the other end of the shaft 151, outside the side frame 52, is secured a pulley 153, which is operatively connected by a belt 154 to a pulley 155, also on the outside of the side frame 52, and secured to the shaft 88. As has been previously described, the pulley 87 is caused to rotate continuously by the motor 47, and transmits power to the shaft 88 through the belt 86 and the pulley 85. It will be seen that through the system of belts and pulleys described above, all of the shafts 136, 141, 142, 149, 150, and 151 are also caused to rotate continuously. Rotation of these shafts and the driving means mounted thereon furnishes the required movement for feeding the cards 33 from the stack on the table 60 through the feeder to the accounting machine.

As has been previously stated, the topmost card 33 of the card stack on the table 60 is blown into contact with the lower portion of the periphery of the cylinders 134 by the air stream from the tubes 131 and 132. This card is retained in engagement with the periphery of the cylinders 134 by a vacuum applied to the card through the apertures 135 in the cylinders 134 and transmitted to the interior of the cylinders 134 from the vacuum pump 46, which is driven by the continuously-operating motor 47. A tube 158 (FIGS. 2 and 5) extends from the vacuum pump 46 through the base member 81 to a solenoid-operated valve 159, which is used to control the application of vacuum to the cylinders 134, and which contains the vacuum solenoid L101. The manner in which this valve is controlled by the control circuitry of the card feeder will be described subsequently.

From the valve 159 the vacuum is transmitted via tubes 160 and 160a (FIGS. 4 and 5) to a pair of blocks 161 positioned in the hollow interiors of the cylinders 134. A passage 162 in each of the blocks 161 receives one end of the tube 160a and provides a path to the apertures 135, which extend through the cylinders 134 into the hollow interiors thereof. The blocks 161 are secured by bolts 163 to a supporting plate 164, which in turn is secured by means of bolts 165 to the bars 53 and 54. A gasket 166 is provided between the block 161 and the plate 164 for a presure-tight connection.

Figure 3:
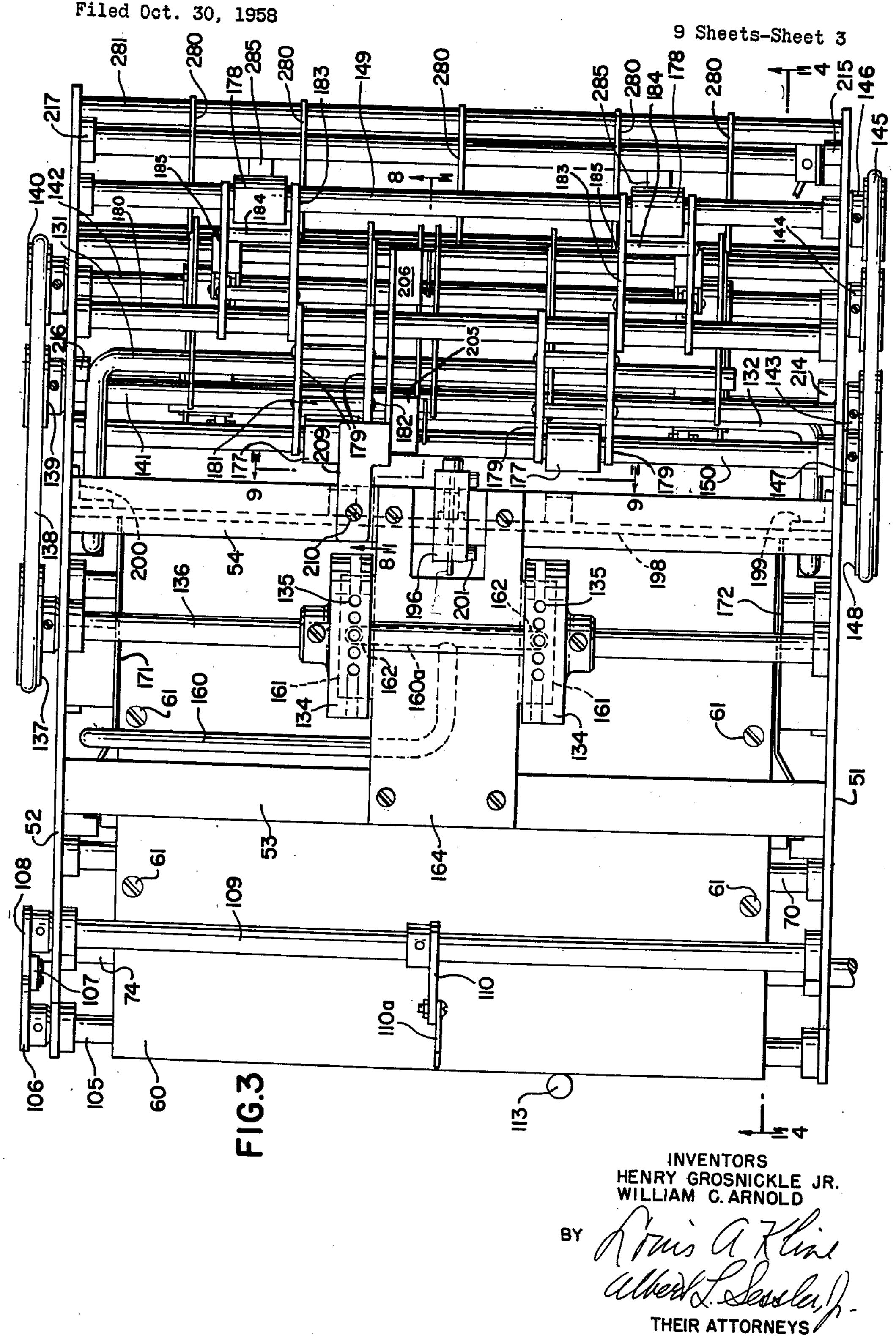
FIG. 3 is a top view of the record member feeding device.

It may be noted that the vertical runs of the tubes, such as 131, 132, and 160, are shielded behind plates 171 and 172 (FIGS. 3 and 4). These plates prevent accidental contact with the tubes and also serve to guide the stacks of cards 33 as said stacks are placed into position on the table 60.

In addition to the cylinders 134, further feed rollers are provided for passing the topmost card 33 of the stack on the table 60 from said stack to the accounting machine. These additional rollers include a pair of rollers 175 secured to the shaft 150 and a pair of rollers 176 secured to the shaft 149. It will be recalled that the shafts 149 and 150 are continuously driven by the motor 47 through the belt and pulley system previously described. Pairs of pressure rollers 177 and 178, respectively, are provided in cooperative relation to the feed rollers 175 and 176. Each of the rollers 177 is mounted between a pair of arms 179, which are in turn pivotally mounted on a shaft 180 extending between the side frames 51 and 52, and secured thereto. The arms 179 are retained in proper relation by spacers 181 and securing members 182, which extend between the arms and support the spacers 181. The rollers 178 are similarly mounted between pairs of arms 183 pivoted on the shaft 180, and are secured in spaced-apart relationship by spacers 184 and securing members 185. The rollers 177 and 178 ride directly on the rollers 175 and 176 when no card 33 is being fed, and when a card 33 is introduced to the rollers 175 and 176, the rollers 177 and 178 rest upon said card and urge it into frictional engagement with the rollers 175 and 176 to facilitate the feeding of the card 33 by said rollers.

Supporting means are provided between the rollers 175 and 176 to prevent a card from slipping down below said rollers and thus possibly causing the feeding device to jam. Said means include a plurality of supporting bars 190, said bars being mounted in spaced relationship on two rods 191 and 192 extending between and secured to the side frames 51 and 52.

Gauging means are provided immediately to the left of the rollers 175 (FIGS. 3 and 4) to insure that only one card 33 will be passed from the stack on the table 60 to said rollers and thence fed into the accounting machine. Said gauging means, shown particularly in FIGS. 3, 4, and 9, includes an upper blade 195, supported by means of a C-shaped member 196 on the bar 54, and a lower element 197, supported on a vertical member 198 extending between angle frames 199 and 200 secured, respectively, to the side frames 51 and 52. The space between the blade 195 and the member 197 is such as to permit only one card 33 at a time to pass therebetween. This eliminates the possibility of a plurality of cards being fed from the stack into the accounting machine at the same time, and thus causing jamming of the machine or producing erroneous results. Adjusting means are provided for varying the spacing between the blade 195 and the member 197, and include a pair of screws 201, which threadedly engage the member 196 so that their ends bear against the blade 195. Adjustment may be simply and easily effected by loosening the two screws 201, positioning the blade 195 as desired, and then retightening the screws so that the blade is held firmly in its new position in the block 196.

Means are provided in association with the gauging means to guide the cards 33 through the space between the blade 195 and the member 197, and to prevent any jamming of cards at the gauge. A pair of guides 202 are secured to the plate 198 and are curved in such a manner as to urge the card 33 being fed to the right by the cylinders 134 into proper position to pass between the blade 195 and the member 197. As may be seen particularly in FIG. 9, the guides 202 are positioned at either side of the gauging means, and the upper ends of said guides actually extend above the space between the blade 195 and the member 197. The card 33 being fed is thus urged along the tapered surface 203 of the blade 195 and is thereby fed smoothly into the space between said blade and the member 197.

As each card 33 is fed from the stack on the table 60 into the accounting machine, it actuates a pair of switches 205 and 206 (FIGS. 3, 4, and 8) for control of certain of the operating circuits of the feeding device, as will subsequently be described. The switches 205 and 206 are actuated by feelers 207 and 208, respectively, which extend into the path of movement of the card 33 and are shifted by passage of the card to actuate their respective switches. The switches 205 and 206 are secured for support upon a bracket 209, which in turn is supported upon the shaft 180 and upon the bar 54, to which it is secured by a bolt 210.

A pair of studs 214 and 215 are mounted on the side frame 51 adjacent its right end, as viewed in FIG. 3, and a corresponding pair of studs 216 and 217 are mounted near the right end of the side frame 52. The two studs 214 and 216 serve as pivots for a guide plate 218 having a pair of slotted ears 219 at one end thereof, the slots in said ears being of a size to fit over the studs 214 and 216, so that the plate 218 is pivoted thereon. At its other end, the plate 218 is provided with a pair of supporting ears 220 (FIGS. 2 and 10), one at each edge, which are arranged to rest upon the top surface of a second guide plate 221, to space apart the guide plates 218 and 221, so that a card 33 may be fed therebetween. The plate 221 is provided at one end with slotted ears 222, the slots of which are shaped to receive the studs 215 and 217 on the side frames 51 and 52, respectively, for pivoting the plate 221 thereon. At its other end, the plate 221 is provided with a pair of ears 223 at its edges to support the plate 221 in spaced relation from the table 224 of the accounting machine 32. Since the plates 218 and 221 are pivoted on the side frames 51 and 52 of the feeder by means of the slotted ears on said plates, which coact with the studs on the side frames of the feeder, it will be seen that the guide plates 218 and 221 may be lifted completely off of the feeder when said feeder is not in operative relationship with the accounting machine 32. Then, when the feeder 31 is brought into proper position with respect to the accounting machine 32, the guide plate 221 is placed into position with its ears 222 engaging the studs 215 and 217, and with its ears 223 resting upon the table 224 of the accounting machine 32. After the plate 221 has been properly positioned, the plate 218 may be placed in position, with its ears 219 supported by the studs 214 and 216, and with its ears 220 resting upon the upper surface of the guide plate 221. Guide means are thus provided for guiding the ledger card 33 being fed from the feeder 31 into position to be operated upon by the accounting machine 32.

The operation of the feeding mechanism of the card feeder 31 in delivering a ledger card 33 from a stack on the table 60 to the table 224 of the accounting machine 32 will now be described. It will be recalled that the shafts 136, 141, 142, 149, 150, and 151 of the feeding mechanism are driven in a continuous rotation by the motor 47. It will also be recalled that a vacuum is continuously available from the pump 46 for use in connection with the cylinders 134, subject to control by the valve 159, and that constant air pressure is applied through apertures in the tubes 131 and 132 to the forward edge of the stack on the table 60 for separating the cards of said stack, said air pressure being supplied by the pump 48.

The topmost card 33 of the stack on the table 60 is raised, by air pressure from the apertured tubes 131 and 132, to the position 33*a*, shown by dashed lines in FIG. 2, in which position it contacts the periphery of the cylinders 134 at the lowest point thereof. This is merely a sliding contact, in which the cylinders 134 are incapable of moving the card 33, until such time as vacuum is applied by control of the valve 159 to the cylinders 134 and acts through the apertures 135 in said cylinders to bring the card 33 into engagement with the cylinders 134 with sufficient force to enable said cylinders to move said card. The cylinders 134 are rotating counter-clockwise, as viewed in FIG. 2, so that when the vacuum is applied through them to the card in position 33*a*, by operation of the valve 159, the card 33 is moved to the right, as viewed in FIG. 2, through the gauging means comprising the blade 195 and the element 197, which insures that only one card at a time is fed, and into contact with the rollers 175 on the shaft 150. The pressure rollers 177 bear upon the card 33 with sufficient force to insure that it will be driven by the rollers 175 in a direction to the right, as viewed in FIG. 2.

The card 33 then passes over the plates 190 and into contact with the cooperating drive rollers 176 and their pressure rollers 178, which impart a further feeding movement to the card.

It will be noted that in the passage of the card 33 from the rollers 175 to the rollers 176, the card actuates the feelers 207 and 208 of the switches 205 and 206 (FIG. 8), first causing the feelers 207 and 208 to be raised as the leading edge of the card engages them, and then subsequently permitting said feelers to drop back to the position in which they are shown in FIG. 8, after the trailing edge of the card has passed by the feelers. The manner in which the switches 205 and 206 coact in the operation of the card feeder will subsequently be described in the explanation of the circuit diagrams.

Figure 10:
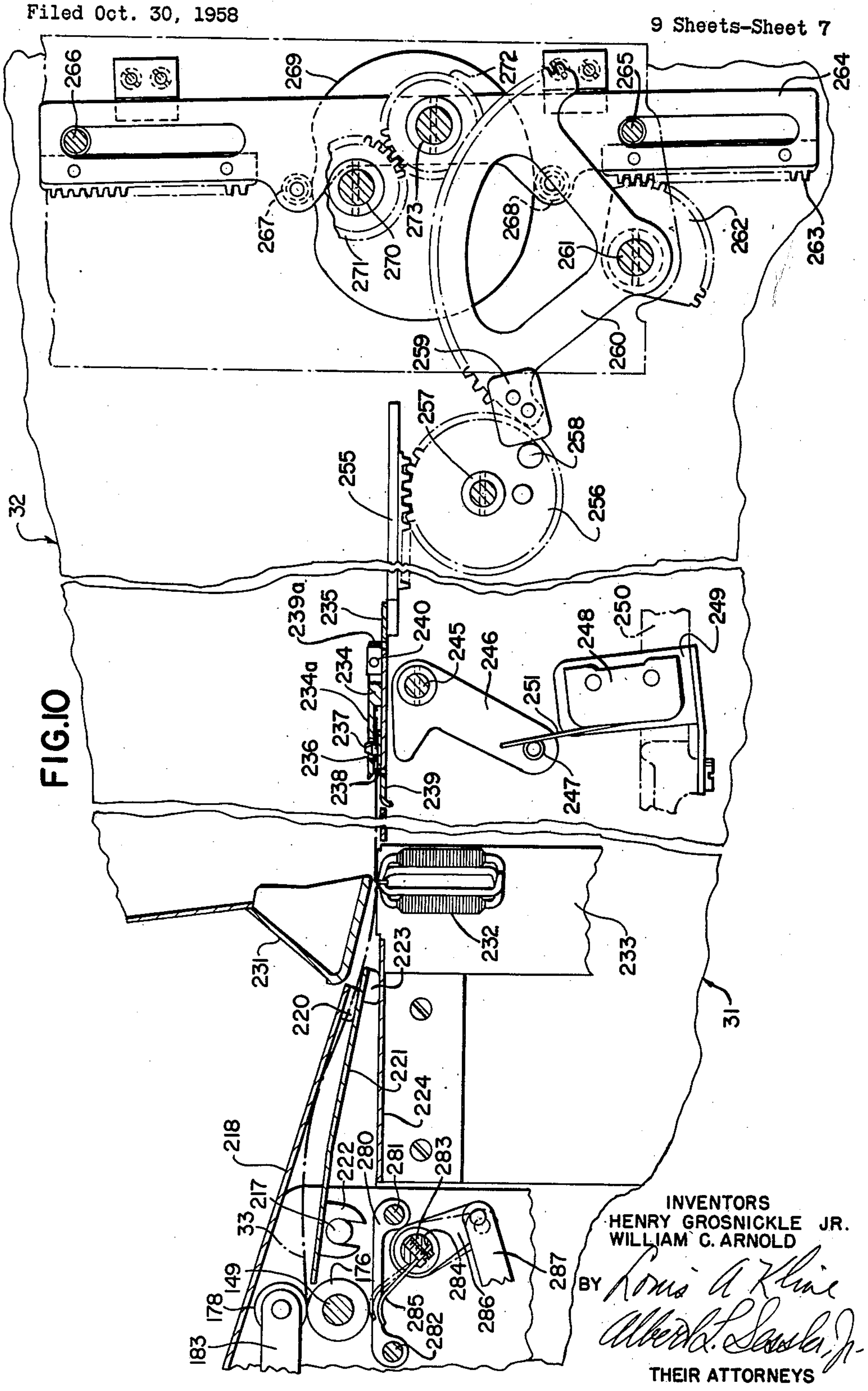
FIG. 10 is a sectional view showing portions of the feeding device and the accounting machine, and the manner in which these two devices cooperate for feeding of record members from the feeding device to the accounting machine.

As best seen in FIGS. 2 and 10, the card 33 is driven by the rollers 176 in cooperation with the pressure rollers 178 to the right into the space between the two guide plates 218 and 221. These plates guide the movement of the card 33 and direct it into the desired position with respect to the accounting machine 32, on which the plates 218 and 221 are supported at one end, said plates thus serving a connecting or bridging function between the feeder 31 and the accounting machine 32.

*Accounting Machine*

The accounting machine described herein in general terms is one with which the card feeder of the present invention has been successfully used. However, it should be realized that the utility of the card feeder is not limited to applications in which this particular accounting machine is used, since the card feeder may be used with any type of accounting machine for which automatic feeding is desired.

The relative positioning of the card feeder 31 and the accounting machine 32 in this illustrative embodiment is shown in FIGS. 1, 2, 10, and 11. It will be noted that a portion of the table 224 of the accounting machine, and of the corresponding structure below said table, is cut away, as designated generally by the reference character 230, to permit the card feeder 31 to be moved into proper operative relationship with said accounting machine. When the card feeder 31 is properly positioned, the guide plates 218 and 221 rest upon the table 224 in such a manner that a card 33 delivered from between said plates will pass over said table and below a guide bar 231. A plurality of magnetic heads 232 are mounted in proper spaced relation in a head-supporting unit 233 fixed in the accounting machine 32. The magnetic heads 232 perform reading and recording functions on the ledger cards 33 by selective magnetization of stripes of magnetic material on said ledger cards, as is fully described in the previously-mentioned United States patent application Serial No. 610,754. The under surface of the guide bar 231 slopes downwardly toward the magnetic heads 232 to form a throat for guiding the ledger cards 33 to the magnetic heads.

The card 33 is fed past the heads 232 a sufficient distance by the rollers 176 in the feeder 31 to cause the leading edge of said card to engage a guide block 234, which is secured to a carriage table 235 mounted for reciprocating movement within the accounting machine 32. The guide block 234 is provided with an overhanging portion 234*a*, under which the card 33 slides, and is tapered at the end of said portion to guide the card 33 into proper engagement with said block. In addition, the guide block 234 is cut out at its rear end to receive a pair of upstanding tabs 239*a* connected to an arm 239. A rod 240 passes through the block 234 and the tabs 239*a* to pivot the arm 239 on the block 234. The arm 239 and two similar arms (not shown), pivoted on two similar guide blocks (not shown), are connected by a cross-bar to form a unitary pivoted member. Secured to the cross-bar is a bar 238, which extends into a recess in the carriage table 235 and carries three studs, the center stud 237 of which is shown. The center stud 237 is round and is arranged to enter an aperture 236 in the overhanging portion 234*a* of the block 234 and the corresponding aperture in the ledger card. The outer studs (not shown) are oval in shape and project through oval-shaped openings in the other guide blocks, and through similar openings in the ledger card. The ends of all of these studs are tapered, so as to guide the ledger card into proper position should it be slightly out of line when fed into the machine. These studs, by engaging the corresponding apertures on the ledger card, hold the ledger card securely on the carriage table 235 during movement of said table.

Operation of the unit including the stud 237, the bar 238, and the arm 239 is controlled by means of a gripper solenoid (not shown) which is energized whenever it is necessary to insert a ledger card into or remove a ledger card from the machine. The gripper solenoid, the linkage connecting said solenoid to the unit described above, and the circuits for controlling the energization and deenergization of the solenoid are all fully disclosed in the previously-cited United States patent application Serial No. 610,754.

If for any reason the card 33 is inserted into the machine by the feeder with the apertures therein out of position to receive the stud 237 and other studs, the studs cannot pass through the openings in the card, and the arm 239, together with its two similar arms, cannot be restored to clamping position. Secured to a shaft 245 located in the accounting machine below the carriage table 235 is a contact operating lever 246 having a stud 247 to actuate the contacts of a switch 248 secured to a bracket 249, which is in turn fastened to a frame member 250 of the accounting machine 32. Downward movement of the arm 239 from the position in which it is shown in FIG. 10 causes said arm to engage the lever 246 to operate the contacts of switch 248, by engagement of the stud 247 with an actuator 251 on the switch 248. Therefore it will be seen that mis-alinement of the card 33 in its positioning upon the carriage table 235 will prevent the stud 237 and the arm 239 from returning to the position in which they are shown in FIG. 10, and therefore will prevent the arm 246 from returning the contacts of the switch 248 to their normal position through coaction of the stud 247 and the actuator 251. The manner in which the contacts of the switch 248 function in the operation of the card-feeding device of the present invention will be explained fully in the subsequent description of the control circuitry of this device.

The ledger card carriage table 235 is secured to a rack 255 supported in the framework of the accounting machine. The rack 255 is maintained by its supporting framework in engagement with a driving gear 256 secured to a shaft 257, supported in the frames of the machine.

A stud 258 secured to the gear 256 is positioned in the path of movement of a block 259 secured to a segment 260 fixed on a shaft 261 supported in the machine framework. The shaft 261 also has secured thereto a segment 262, which meshes with teeth 263 on a rack 264 mounted for vertical sliding movement in the machine on a pair of rods 265 and 266, in turn secured in the machine framework. A pair of rollers 267 and 268, fixed on the rack 264, are positioned to coact with the periphery of a cam 269 fixed to a cam shaft 270. Also fixed to the shaft 270 is a gear 271, which meshes with a companion gear 272 fixed on an auxiliary cam shaft 273. The gears 271 and 272 are of such relative dimensions that the shaft 270 receives one complete rotation for each operation of the auxiliary cam shaft 273. Both of the shafts 270 and 273 are fixed in the machine framework.

When the rack 264 is moved, through the cam 269, by rotation of the auxiliary cam shaft 273, the teeth 263 on said rack engage the teeth of the segment 262 to rotate said segment, the shaft 261, and the segment 260 in a counter-clockwise direction as view in FIG. 10. As is clear from a study of FIG. 10, the segment 260 is not in mesh with the gear 256 in home position of the accounting machine, due to the fact that the teeth adjacent the end of the segment 260 have been removed to permit movement between said segment and the gear 256 for performance of the line-finding function of the accounting machine 32. The cooperating stud 258 and block 259 on the gear 256 and the segment 260, respectively, are provided to overcome this initial lack of meshing between said gear and said segment. When the segment 260 begins to move in a counter-clockwise direction, the block 259 thereon engages the stud 258 on the gear 256 and rotates said gear far enough to mesh the teeth on the segment 260 with the teeth on the gear 256.

The rotation of the auxiliary cam shaft 272 is thus transmitted through the train of mechanism described above to the rack 255 to move said rack, the table 235, and the card captivated thereon to the right, as viewed in FIG. 10, to move the card into the accounting machine past the recording heads 232, so that appropriate operations may be performed in the accounting machine 32 utilizing the information read from the card 33 by means of the magnetic heads 232.

When, at the proper time in the machine cycle of the accounting machine 32, the rack 264 is restored to the position in which it is shown in FIG. 10 by the auxiliary cam shaft 272 acting through the came 269, the teeth 263 on said rack, coacting with the teeth on the segment 262, rotate the segment 262 and the segment 260, which drives the gear 256 to move the rack 255 and shift the carriage 235 outwardly to provide the out-sweep of the card 33 past the heads 232. The card 33 is released from its captivation on the carriage table 235 by energization of the gripper solenoid (not shown) to shift the arm 239 and its companion arms, and the stud 237 and other studs controlled thereby, in a downward direction to free the card 33.

As has been previously stated, a complete description of the construction and operation of the accounting machine 32 may be found in the previously-cited United States patent application Serial No. 610,754.

*Card Retrieval and Sorting Means*

When the accounting machine 32 has completed all of the entries which it is desired to make at this on a ledger card 33, said card is moved by the carriage table 235 to the left, as shown in FIG. 10 to the limit of movement of the table 235 in that direction. During this movement, the card 33 slides on the table 224 of the accounting machine 32 below the guide plate 221, and is moved sufficiently to the left that its leading edge in the direction of travel is carried back into the card feeder 31, and on to a plurality of guide members 280, below the rollers 176. The guide members 280 are supported on two rods 281 and 282 anchored in the side frames 51 and 52.

At this time, the gripper solenoid (not shown) in the accounting machine is energized to rotate the arm 239 and the studs, including stud 237, associated therewith, in a counter-clockwise direction, as viewed in FIG. 10, to shift said studs out of engagement with the apertures in the card 33. The card 33 is thus released from the accounting machine 32 and is returned to the control of the card feeder. The construction and operation of the card feeder for handling the card 33 from this point on will now be described.

As best seen in FIGS. 2, 4, 5, and 10, a shaft 283, mounted in the side frames 51 and 52, is formed with a flat portion 284, on which are secured a plurality of fingers 285. These fingers are positioned on the shaft 283 to move between the guide members 280, and are curved at their upper ends to provide a surface for engaging the under side of a card 33 to move the upper surface of said card into frictional engagement with the under side of the rollers 176. The fingers 285 are normally disposed in the full-line position shown in FIG. 10, out of card-engaging position, but may be shifted to the dashed-line position shown in FIG. 10 for engagement with a card 33.

Also secured to the shaft 283 is an arm 286, which is pivotally connected to one end of a link 287. The other end of the link 287 is pivotally connected to a solenoid 288 mounted on a bracket 289, secured to the side frame 51. It will be seen that energization of the solenoid 288 will act through the link 287 and the arm 286 to rock the shaft 283 for shifting the fingers 285 from the solid-line position shown in FIG. 10 to the dashed-line position shown therein.

A plurality of arcuate guide members 293 are located in the card feeder 31 to the left of the rollers 176, as viewed in FIGS. 2 and 4, and are supported on the shafts 192 and 294, which extend between the side frames 51 and 52, and are anchored therein. The guide members 293 serve to guide the cards 33 downwardly and to the left. Additional feed rollers 295 and 296, secured to the constantly-rotating shafts 142 and 141, respectively, are positioned adjacent to the arcuate surfaces of the members 293. Pressure rollers 297 and 298, respectively, cooperate with the rollers 295 and 296 for feeding of the cards 33 along the arcuate surfaces of the members 293. The pressure rollers are mounted in brackets 299 and 300, pivoted on the shafts 192 and 294, respectively, and are urged by spring means (not shown) toward engagement with their respective feed rollers 295 and 296.

A plurality of sorting fingers 301, secured on a shaft 302 journaled in the side frames 51 and 52, are located near the lower ends of the members 293, and can assume either one of two positions. In the first position of the fingers 301, shown in solid lines in FIG. 2, these fingers intersect the arcuate surfaces defined by the guide members 293, so that the card 33 being fed along this arcuate surface by the rollers 295 and 296 will be diverted by the fingers 301 over a guide 303 and into the upper bin 44 of the feeder 31. In the second position of the fingers 301, shown in dashed lines in FIG. 2, these fingers are positioned out of the path of movement of the card 33 along the members 293, and the cards will accordingly be fed over a guide plate 304 into the lower bin 45 of the feeder 31.

Movement of the fingers 301 from one position to the other is controlled by a solenoid 305 mounted on a bracket 306 secured to the bar 292, which extends between the side frames 51 and 52. A link 307 connects the solenoid 305 to an arm 308 secured to the shaft 302, and it will be seen that energization of the solenoid 305 will cause the fingers 301 to be shifted, through the link 307 and the arm 308, from their solid-line position to their dashed-line position, while deenergization of said solenoid will cause them to return to their solid-line position by virtue of spring means (not shown) contained in said solenoid.

The operation of the card retrieval and sorting means will now be described. As previously stated, when the card 33 is carried by the carriage table 235 (FIG. 10) of the accounting machine 32 to the outward limit of movement of said table, the leading edge of the card 33 is carried over the table 224 to the left of, and beneath, the rollers 176. Upon energization of the gripper solenoid to release the card 33 from the carriage table 235, said card is free to be controlled by the feeder 31. This control is initiated by energization of the solenoid 288, which acts through the link 287 and the arm 286 to shift the fingers 285 into the dashed-line position shown in FIG. 10, in which they press the card 33 against the lower surface of the feed rollers 176 to cause said card to be fed to the left as viewed in FIGS. 2, 4, and 10.

The card 33 is then fed around the arcuate surfaces of the members 293 by the feed rollers 295 and 296 in cooperation with the pressure rollers 297 and 298. The card 33 will then be fed either into the bin 44 or into the bin 45, depending upon whether or not the solenoid 305 is energized. The controls for energization of the solenoid 305 will be fully described in the explanation of the electrical control circuitry of the card feeder, subsequently in this specification. When the solenoid 305 is not energized, the surfaces of the fingers 301 are located in intersecting relationship to the arcuate surface defined by the members 293, and act to divert the card 33 over the guide 303 and into the upper bin 44 of the card feeder. On the other hand, when the solenoid 305 is energized, the card 33 passes between the fingers 301 and the members 293, over the guide 304 and into the lower bin 45 of the card feeder.

*Feeder Control Board*

A control board 315 (FIGS. 1 and 12) is provided for the feeder 31, and is positioned on the feeder cabinet above the opening provided in said cabinet for stacking ledger cards 33 on the table 60. The control board 315 contains switches for controlling various functions of the feeder and also contains indication means which describe the condition of the system to the operator. The control board 315 is secured to the feeder cabinet by means of a plurality of screws, such as 316.

Centrally located on the control board 315 are four rectangular apertures 317, 318, 319, and 320. An indicator light is positioned behind each of these apertures, and a protective transparent member is positioned between each aperture and its respective indicator light. Appropriate lettering appears adjacent each aperture, denoting the particular element or function which its particular indicator light serves to describe.

The aperture 317 is caused to be lighted by its particular light when a card is not positioned correctly in the accounting machine. Aperture 318 is lighted when the accounting machine fails to pick up a signal from one or more of the magnetic channels on the ledger card 33 being operated upon, but has picked up the correct account number from the ledger card.

Aperture 319 becomes lighted after the accounting machine has been turned on, and as soon as the various electronic components in the accounting machine are warmed up and in operating condition. Aperture 320 is lighted whenever power is applied to the feeder.

To the right of the apertures 317 to 320 inclusive are three push buttons 322, 323, and 324. The push button 322 operates a switch which enables manual card feeding to the accounting machine. The push button 323 operates a switch which in turn causes the manual ejection of a card from the accounting machine. The push button 324 operates a switch to cause the accounting machine to make a card pickup.

To the left of the apertures 317 to 320 inclusive are three toggle switches 327, 328, and 329. The switch 327 may be set for either manual or automatic operation, and will prevent automatic operation of the card feeder 31 when set in its "manual" position. The switch 328 is a switch which is utilized to turn the power on or off to the feeder 31, while the switch 329 is a similar "off-on" switch which applies power to the accounting machine.

Below the switches 327, 328, and 329 are two key-operated switches 332 and 333. These switches are controlled by keys which will normally be in the possession of the supervisor who is responsible for the operation of the accounting system. This provides a desirable control and supervision over the type of operations which can be performed by the accounting machine operating with the feeder. The switch 332 provides a control by means of which overdraft balances may be separated in a sorting operation from other balances if desired, according to whether the switch 332 is set in a "sort" or a "no sort" position. The switch 333 is used to set the feeder according to the type of operation which it is desired to perform. When the switch 333 is in its upper or "post and trial balance" position, the feeder will perform posting and trial balance operations, while when the switch 333 is in its lower or "transfer" position, the feeder will perform transfer operations.

The manner in which the various switches and indicator lights described above and positioned on the control board 315 cooperate in the operation and control of the feeder 31 is explained in the description of the control circuitry of the novel device of the present invention, contained below.

*Feeder Control Circuitry*

The circuitry which controls the timing and operation of the various mechanical components of the feeder hereinbefore described will now be explained. Only the circuitry directly related to feeder operation is described herein, and where this circuitry is also associated with the accounting machine circuitry, the points of connection, or the components of the accounting machine to which the feeder circuitry is connected, are given. For a complete description of the operating circuitry of the accounting machine with which the feeder is associated in the instant embodiment, reference may be had to the previously-cited United States application Serial No. 610,754.

The feeder circuitry includes, in addition to the switches, solenoids, lights, etc., disclosed in the mechanical portion of the description, a plurality of switching relays. These relays are not specifically shown in any mechanical views, but are physically located in a relay rack mounted within the feeder cabinet, supported by the framework of the feeder. The relays are designated K101 to K109 inclusive in FIG. 15, which shows the energizing circuitry for the various relays.

Figure 15:
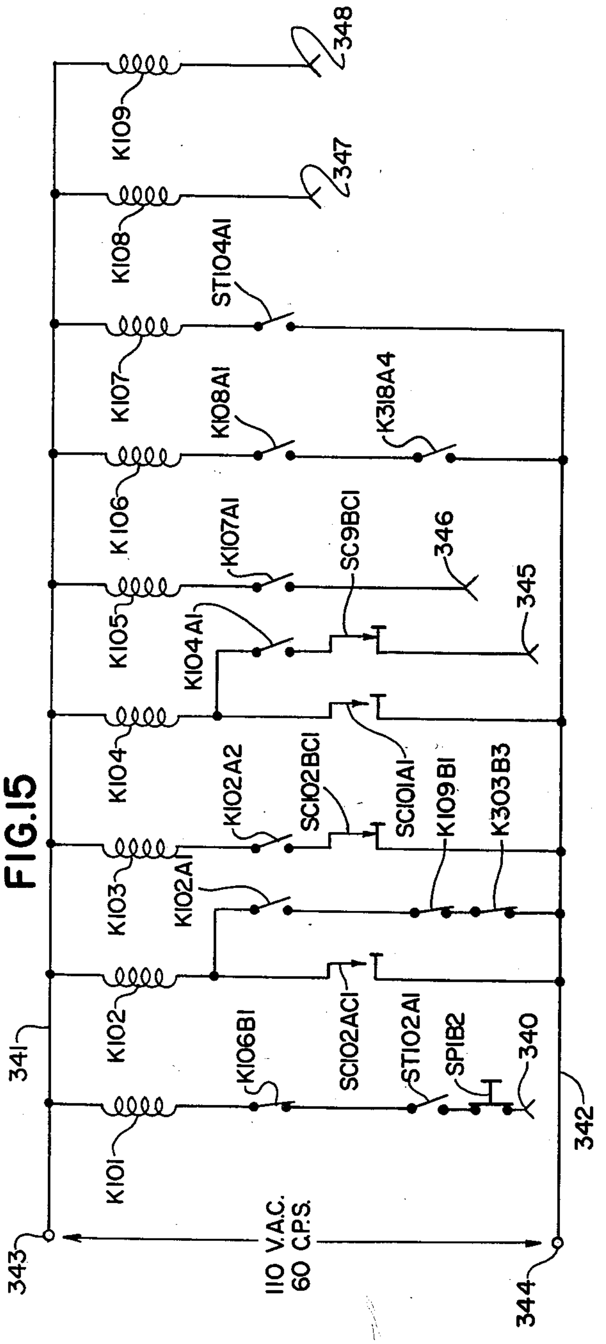

Relay K101 serves a gripper indication function, and its energizing circuit is connected into the circuit for the gripper solenoid (not shown) of the accounting machine at point 340 (FIG. 15). Said circuit extends from point 340 over a manually operated, manually closed switch SP1B2 of the accounting machine, used for manual release of a ledger card, the normally open contacts ST102A1 controlled by the switch 327 on the feeder control board 315, the normally closed contacts K106B1 of the relay K106, and the relay K101 to the main line 341. It will be noted that 110 volts alternating current is applied to the circuit of FIG. 15 over the terminals 343 and 344, and the lines 341 and 342.

The energizing circuit for the relay K101 is prepared by the accounting machine circuitry whenever the accounting machine is in condition to receive another ledger card. Such condition will occur when the accounting machine has completed a new balance operation or a pickup operation in the transfer or trial balance position. This condition is maintained until the next accounting machine cycle of operation begins.

Closing of the contacts ST102A1 completes the energizing circuit for the relay K101. These contacts are closed if automatic operation of the feeder is desired, rather than manual operation. It will be seen that if the switch 327 is maintained in closed position, the energization of the relay K101 is controlled by the accounting machine, to provide automatic feeding of ledger cards by the feeder on demand of the accounting machine.

The normally closed contacts K106B1 are effective to interrupt the energizing circuit for the relay K101 whenever the relay K106 is energized. As will be subsequently explained, the relay K106 is energized in case of a pawl check failure in the accounting machine, and the contact K106B1 can thus provide interlock means to prevent erroneous operation. The relay contacts operated by the relay K101, and the controls which they exert, will be explained in the description of the various circuits in which they are located.

The set trip relay K102 and the trip relay K103 cooperate to control the cycling of the accounting machine. The relay K102 energizes when the contacts SC102AC1 are closed by operation of the switch 206 (FIG. 8). It will be recalled that the switch 206 is operated by its feeler 208 when the leading edge of the card engages the feeler 208 and rocks it counter-clockwise as the card is fed through the final set of feed and pressure rollers prior to entering the accounting machine.

When energized, the relay K102 closes the contacts K102A1 to compleete a holding circuit for itself over said contacts, the contacts K109B1, and the contacts K303B3. The contacts K109B1 are normally closed, opening only when the storage indication relay K109 is energized. The normally closed contacts K303B3 are controlled by a balance pickup relay in the accounting machine, which energizes and thus opens the contacts K303B3 at the beginning of a pickup cycle of the accounting machine.

This holding circuit for retaining the relay K102 in energized condition is maintained until the accounting machine begins a new balance or pickup operation. In the case of a new balance operation, the relay K109 is energized to open the contacts K109B1, and in the case of a pickup operation, the energization of the balance pickup relay in the accounting machine opens the contacts K303B3.

The energizing circuit for the trip relay K103 includes, in addition to said relay, the contacts K102A2 and the contacts SC102BC1. Energization of the relay K102 prepares the energizing circuit for the trip relay K103 by closing the contacts K102A2.

The trip relay K103 is then energized when the contacts SC102BC1 close. These contacts are contained in the switch 206 (FIG. 8) and are closed when the feeler 208, which has previously been rocked in a counter-clockwise direction by engagement with the leading edge of the ledger card 33 being fed to the accounting machine, is permitted to return to the position in which it is shown in FIG. 8 by the passage of the trailing edge of the card 33 past said feeler.

The vacuum-off relay K104 functions to control the operation of the vacuum system of the feeder. The relay K104 energizes when the contacts SC101A1, contained in the switch 205 and operated by the feeler 207, are closed by passage of the leading edge of a card 33 past the said feeler. Energization of the relay K104 causes the contacts K104A1 to close to complete a holding circuit for said relay over the normally closed contacts SC9BC1 in the switch 248 (FIG. 10) in the accounting machine and the point 345, which is connected to an operating circuit in the accounting machine. The relay K104 remains energized over this holding circuit until the card 33 which caused the relay K104 to become energized by operation of the contacts SC101A1 is accepted by the accounting machine in an accounting machine pickup operation. When the accounting machine accepts this card in a pickup operation, the contacts SC9BC1 in the switch 248 of the accounting machine are opened, to open the holding circuit for the relay K104 and thus denergize said relay.

The transfer relay K105 functions to control the balance pickup and new balance circuits of the accounting machine, and also functions to control bin selection in the feeder, to determine into which of the bins 44 and 45 a card 33 will be placed when ejected by the accounting machine 32. The energizing circuit for the relay K105 extends over said relay, the contact K107A1, and a point 346 to a sequence relay operating circuit in the accounting machine. Power is applied to the point 346 through the sequence relay circuit in the accounting machine when a new balance operation is completed by the accounting machine, and this power remains on until the commencement of the next operation of the accounting machine. The contacts K107A1 are closed to complete the energizing circuit for the relay K105 by energization of the post-transfer relay K107.

The pawl check relay K106 functions to control indicating means which indicate, in transfer and trial balance operations, whether or not the accounting machine has failed to pick up a signal from one or more channels of the ledger card 33. The energizing circuit for the relay K106 extends from the line 341 over said relay, contacts K108A1 controlled by the relay K108, and contacts K318A4 controlled by the accounting machine, to the line 342. A relay in the accounting machine controlling the contacts K318A4 remains energized throughout transfer and trial balance operations and becomes energized in posting operations whenever the account number of the ledger card being operated upon agrees with a number entered into the machine relating to the account to be posted. The contacts K318A4 are closed by energization of this relay. The contacts K108A1 are closed by energization of the relay K108, which takes place when the accounting machine fails to pick up a signal from one or more channels on the ledger card. This results in energization of the relay K106. This relay remains energized until a satisfactory pickup operation has been made by the accounting machine, at which time the contacts K108A1 and K318A4 are opened once more to deenergize the relay K106.

The post-transfer relay K107 functions to control the feeder for performing different types of operations. According to the condition of this relay, the feeder, in conjunction with the accounting machine, may perform either transfer operations or posting and trial balance operations. Energization of the relay K107 conditions the feeder for performance of transfer operations, while deenergization of the relay K107 conditions the feeder for posting and trial balance operations. The energizing circuit for the relay K107 extends from the line 341 over said relay and the contacts ST104A1 to the line 342. It will be recalled that the contacts ST104A1 are controlled by the switch 333 on the feeder control board 315 shown in FIG. 12. Positioning the switch 333 to its lower "transfer" position closes the contacts ST104A1, so that the relay K107 is energized whenever power is applied to the terminals 343 and 344. On the other hand, when the switch 333 is in its upper "post-trial balance" position, the contacts ST104A1 are opened, and the relay K107 is deenergized.

The pawl check indication relay K108 functions to assist in the operation of the pawl check indication. The energizing circuit for the relay K108 extends from the line 341 over said relay to a point 347 in the pawl check failure circuit in the accounting machine, and is energized when the accounting machine fails, during a pickup, to pick up a signal from one or more channels of the card 33 being operated upon. The relay K108 then remains energized until the next balance pickup operation. The operating circuit in the accounting machine to which the relay K108 is connected operates at any time that there is a short cycle in said accounting machine.

The storage indication relay K109 functions to aid in control of the feeder during transfer operations. The energizing circuit for the relay K109 extends from the line 341 over said relay to a point 348, which is connected to the operating circuit for a storage relay in the accounting machine. The relay K109 is energized every time the accounting machine is carried through a storage cycle of operation, said relay being energized during the new balance operation of the accounting machine, and being deenergized at the end of a new balance operation of the accounting machine.

Figure 16:
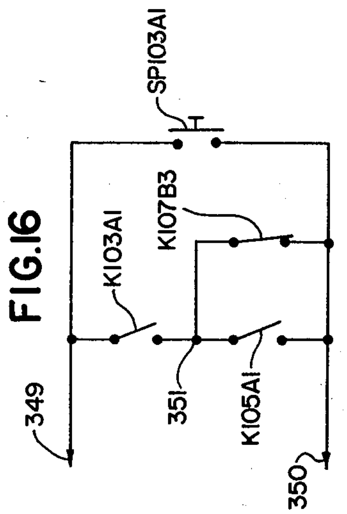

The circuit shown in FIG. 16 will now be described. This circuit is utilized to provide control by the feeder of balance pickup operations in the accounting machine. A manually operated switch (not shown) is provided on the accounting machine for initiation of balance pickup operations. The circuit of FIG. 16 is connected into the circuit of the manually operated switch in the accounting machine at point 349 and point 350, to provide a by-pass of said manually operated switch. Both automatic and manual control means are provided by the feeder for control of balance pickup operations of the accounting machine. When it is desired to initiate a balance pickup operation manually from the feeder, the push button 324 on the feeder control board 315 is depressed, thereby closing the contacts SP103A1 and completing the circuit between point 349 and point 350. Subsequent release of the push button 324 and opening of the contacts SP103A1 effect the actual initiation of a balance pickup operation. Automatic control of initiation of balance pickup operations of the accounting machine is provided by the three relay contacts K103A1, K105A1, and K107B3. The contacts K105A1 and K107B3 are connected in parallel between the point 350 and a point 351 in the circuit of FIG. 16, and the contacts K103A1 are connected between the point 351 and the point 349 in said circuit. When the switch 333 on the feeder control board 315 is in the "post and trial balance" position, the relay K107 will be deenergized, and the contacts K107B3 are thereby closed. The balance pickup circuit is then operated by the closing of the contacts K103A1, which takes place when the relay K103 is energized following closing of the contacts SC102BC1 (FIG. 15) caused by feeding of a card 33 past the feeler 208 of the switch 206. The actual pickup by the accounting machine is then initiated by the opening of the contacts K103A1 to interrupt the circuit through point 349 and point 350, which occurs when the relay K103 is deenergized. As previously described, the relay K103 is deenergized by opening of the contacts K102A2 (FIG. 15) due to deenergization of the relay K102 by opening of the contacts K303B3 in the accounting machine.

When the switch 333 on the control board 315 is in "transfer" position, the contacts K107B3 are open due to energization of the relay K107, and the circuit of FIG. 16 is prepared by closing of the contacts K105A1, which takes place when the relay K105 energizes following completion of a new balance operation by the accounting machine.

Figure 17:
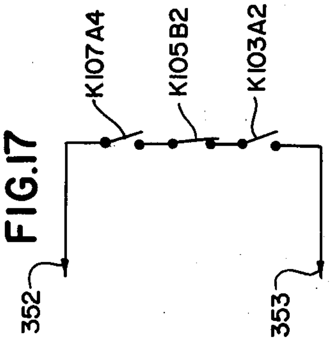

The circuit of FIG. 17, which is provided for control by the feeder of new balance operations of the accounting machine, will now be described. The circuit of FIG. 17 is connected at point 352 and point 353 into a new balance operating circuit in the accounting machine, said circuit being the energizing circuit for a new balance solenoid (not shown). When the switch 333 on the feeder control board 315 is in "post and trial balance" position, the circuit of FIG. 17 is always disabled, since the relay K107 of FIG. 15 is maintained in a deenergized condition, causing the relay contacts K107A4 to remain open. However, when the switch 333 on the board 315 is moved to "transfer" position, the relay K107 is energized, thus closing the contacts K107A4. When the relay K105 deenergizes, in the manner previously described, the contacts K105B2 close, thereby preparing the circuit of FIG. 17. Said circuit is completed, and the new balance operation is initiated, by closing of the contacts K103A2 when the trip relay K103 is energized in the manner previously described. Opening of the contacts K103A2 to reset the circuit of FIG. 17 is effected by deenergization of the relay K103, through opening of the contacts K102A2, which is caused by deenergization of the relay K102, which in this instance results from opening of the contacts K109B1.

Figure 14:
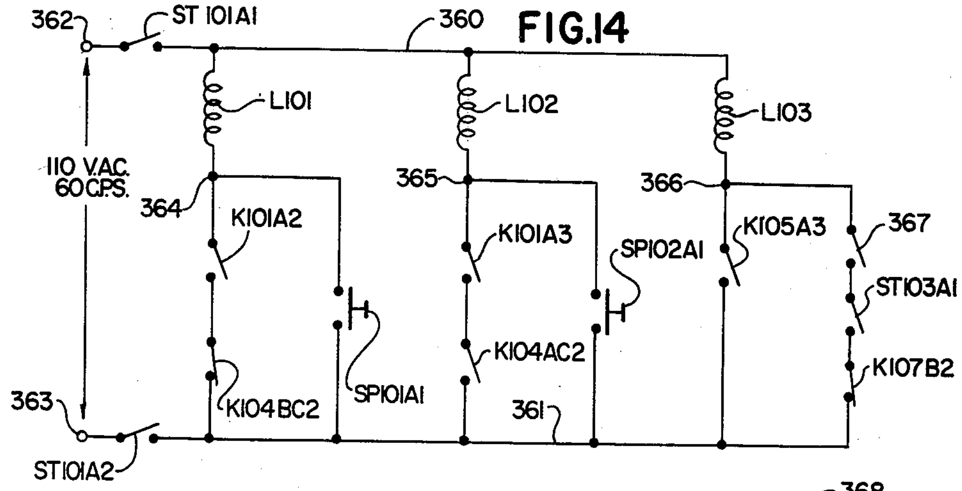

As has been previously described, certain mechanism of the feeder is controlled by the solenoids L101, L102, and L103. The energizing circuits for these three solenoids are shown in FIG. 14, where 110 volts alternating current is applied to the lines 360 and 361 from terminals 362 and 363 over the feeder power switch contacts ST101A1 and ST101A2, controlled by the toggle switch 328 on the control board 315 of the feeder. The energizing circuit for the vacuum solenoid L101 extends from the line 360 over said solenoid, a point 364, the normally opened contacts K101A2, and the normally closed contacts K104BC2 to the line 361. Manual control of energization of the solenoid L101 is provided for by the contacts SP101A1 connected in parallel to the contacts K101A2 and K104BC2 between the line 361 and the point 364. It will be recalled that the contacts SP101A1 are controlled by the push button 322 on the control board 315 of the feeder.

The solenoid L101 controls the valve 159 to apply vacuum to the cylinders 134 of the feeder for feeding the cards 33 to the various sets of drive rollers, and is energized at the time that the previously fed card 33 is released from the accounting machine. Release of this previous card from the accounting machine causes energization of the relay K101, thereby closing the contacts K101A2 and completing the energizing circuits for the solenoids L101. The solenoid L101 is deenergized by opening of the contacts K104BC2, which open when the relay K104 energizes as the card 33 being fed strikes the feeler 207 to operate the contacts SC101A1. In the event that manual operation of the feeder is desired, depression of the push button 322 on the board 315 results in closing of the contacts SP101A1, thereby energizing the vacuum solenoid L101 to cause initiation of a card-feeding operation by the feeder.

As previously described in the mechanical description of the card feeder, the eject solenoid L102 functions to eject a card from the accounting machine by shifting the fingers 285 in such a manner as to press a card 33, which has been released by the accounting machine, into engagement with the drive rollers 176 of the feeder to cause the card 33 to be ejected from the accounting machine and deposited in one of the two bins 44 and 45 of the feeder. The energizing circuit for the solenoid L102 extends from the line 360 over said solenoid, a point 365, and the serially connected contacts K101A3 and K104AC2 to the line 361. An alternate parallel path is provided between the point 365 and the line 361 over the normally opened contacts SP102A1, which are controlled by the push button 323 on the board 315. The push button 323, and its associated contacts SP102A1, enable the eject solenoid L102 to be energized by the operator, when desired, for ejection of a card from the accounting machine.

The normal energizing circuit for the solenoid L102 over the contacts K101A3 and K104AC2 is prepared by closing of the contacts K101A3, which takes place when the relay K101 energizes on release of a card 33 from the accounting machine. The energizing circuit is then completed by closing of the contacts K104AC2, which takes place when the relay K104 energizes under control of the feeler-operated contacts SC101A1. Deenergization of the solenoid L102 is caused by opening of the contacts K101A3, under control of the relay K101 at the beginning of a cycle of accounting machine operation.

The transfer-overdraft solenoid L103 functions to separate ledger cards 33 which have been ejected from the accounting machine into two different stacks by operation of bin controls on the feeder for sending the cards into one or the other of the bins 44 and 45. An energizing path for this solenoid extends from the line 360, over said solenoid, a point 366, and the contacts K105A3 to the line 361. An alternate path extends between the point 366 and the line 361, and includes a set of contacts 367 controlled by the overdraft mechanism of the accounting machine, the contacts ST103A1 which are controlled by the switch 332 on the feeder control board 315, and the contacts K107B2.

When the feeder is conditioned for transfer operations, according to the positioning of the switch 333, the contacts K107B2 are open, as previously described, and energization of the solenoid L103 is caused by closing of the contacts K105A3. These contacts close when the relay K105 energizes at the end of each new balance operation. The solenoid L103, under the control of the relay K105 through the contacts K105A3, deenergizes at the beginning of the next pickup operation of the accounting machine.

When the switch 333 on the control board 315 of the feeder is set to "post and trial balance" position, the contacts K107B2 are closed, and the contacts K105A3 are opened. Then, if the switch 332 on the board 315 is set to "sort" position, thus closing the contacts ST103A1, all overdraft balances of the accounting machine will cause energization of the solenoid L103 by closing the switch contacts 367. Said solenoid in this event is deenergized when the switch contacts 367 are opened by the accounting machine going out of overdraft position.

Figures 12, 13:
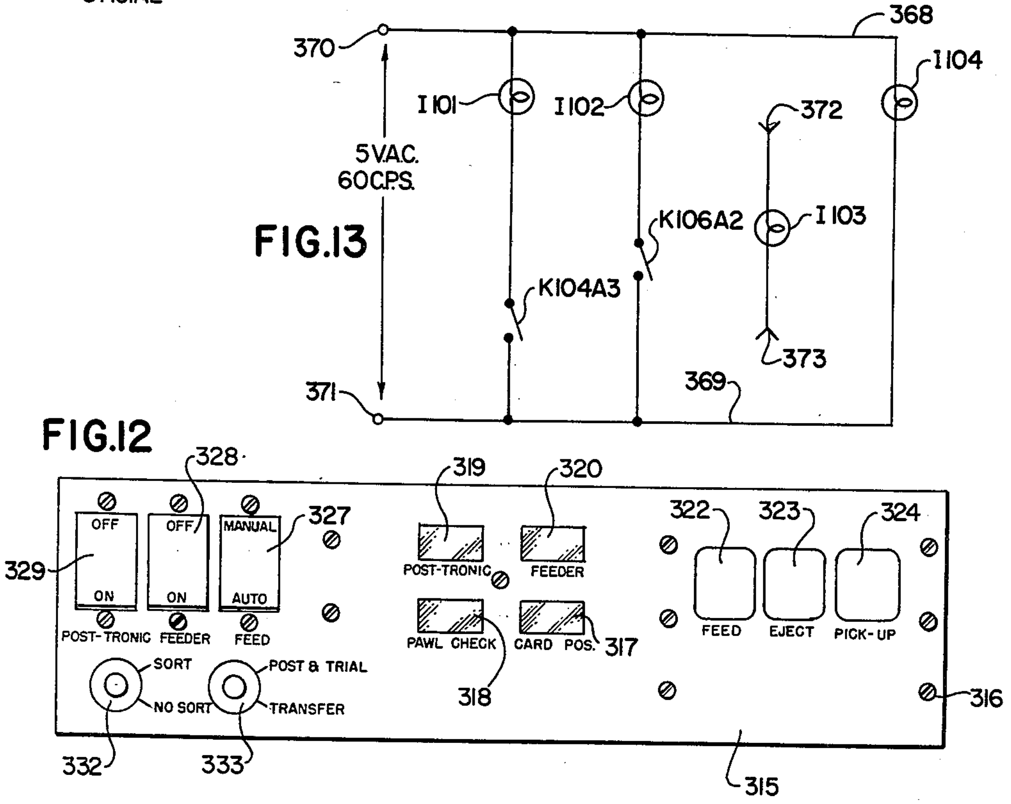
FIG. 12 is a view showing the control board of the feeding device.

As set forth in the description of the feeder control board 315, indicating means are provided to show the condition of the feeder at various times and in various operations. Four visual indicating means, in the form of light bulbs, are shown in the circuit of FIG. 13 and include the light bulbs I101, I102, I103, and I104. The light bulbs I101, I102, and I104 are connected between lines 368 and 369, respectively terminating in terminals 370 and 371, between which is applied 5 volts alternating current.

Power for the bulb I101 is provided in a circuit which extends from the line 368 over said bulb and the contacts K104A3 to the line 369. This bulb, which is positioned behind the aperture 317 in the board 315, serves a card-position-indicating function. The contacts K104A3 are closed by energization of the relay K104 during the feeding of each card 33 and complete the circuit for illumination of the light bulb I101. Deenergization of the relay K104 as the card 33 is accepted by the accounting machine opens the contacts K104A3 to extinguish the bulb I101. In the event that the card 33 jams during feeding, or is improperly positioned on the carriage table 235, the bulb I101 will remain lighted.

The pawl check indication bulb I102, which is positioned behind the aperture 318 in the board 315, lights when the accounting machine fails to pick up a signal from one or more channels of the card 33, but has picked up the correct account number. The circuit for supplying power to the bulb I102 extends from the line 368 over said bulb and the contacts K106A2 to the line 369. It is thus seen that the illumination of the bulb I102 is controlled by closing up the contacts K106A2, which are closed by energization of the pawl check relay K106.

The bulb I103, which lights after the accounting machine has gone through a sufficient warm-up period to bring all electronic equipment therein to satisfactory operating conditions, is connected between two points 372 and 373 in an operating circuit of the accounting machine. This bulb is placed behind the aperture 319 on the board 315, and when it assumes a steady level of illumination, serves as an indication that the system is in condition for operation.

The bulb I104, which is positioned behind the aperture 320 in the board 315, is connected directly between the lines 368 and 369, and thus lights whenever power is applied to the feeder.

*Operation*

To assist in the understanding of the illustrated embodiment of the present invention, two typical types of operations of the record member feeding device will be described. It should be understood that the feeding device is capable of performing other types of operations than the ones to be described, and that these operations may differ in some minor details, in the event that the feeding device is used in cooperation with a different type of accounting machine from the one described herein.

The type of operation to be performed by the feeding device is determined by the setting of the switch 333 on the control board 315 (FIG. 12). Setting of the switch 333 to the lower "transfer" position causes the mechanism of the feeder to function in the manner required for a transfer operation, in which balances for each account are taken from one ledger card and are then applied, both by printing and by magnetic coding, to a new ledger card. Setting of the switch 333 to the upper "post and trial balance" position causes the mechanism of the feeder to function in the manner required for a trial balance operation and, under proper conditions, for a posting operation. The feeding device of the present invention is not adapted for use in a posting operation except when a tape-reading device, not shown herein, is attached to the accounting machine to operate automatically said machine, for input of check and deposite data for individual accounts. The combination of the feeding device and the accounting machine, as shown herein, is, however, adapted for use in a trial balance operation. In such an operation, all of the accounts are run through the accounting machine by means of the feeder, and the balance data from each account is picked up from the magnetic coding on each ledger card and is accumulated in the machine to provide a total for trial balance purposes.

Let it first be assumed that it is desired to utilize the feeding device of the present invention, in combination with the accounting machine, to perform a transfer operation on a given series of accounts. In order to accomplish this, the switch 333 of the feeding device 31 is set to "transfer" position, and a control means (not shown) on the accounting machine is set to condition said machine for a transfer operation. It is to be understood that prior to the commencement of this transfer operation, the cards pertaining to the various accounts to be transferred have been sorted and new cards bearing the account numbers corresponding to the various accounts have been collated or inter-sorted, so that all of the cards pertaining to the accounts to be transferred are contained in a stack in which old and new cards alternate, with the old card for each account above the new card for the same account and immediately adjacent thereto. The stack which is thus prepared is then placed on the table 60 of the feeding device 31.

Power is first applied to the accounting machine by proper depression of the switch 329, which closes contacts (not shown) to complete the application of power to the accounting machine. Power is then applied to the feeding device by proper depression of the switch 328, which closes the contacts ST101A1 and ST101A2 (FIG. 14) to apply power to the operating circuitry of the feeding device. Actual initiation of the operating cycle is caused by proper operation of the switch 327, which closes the contacts ST102A1 in the energizing circuit for the relay K101 (FIG. 15). Closing of the contacts ST102A1 causes energization of the relay K101, which in turn closes the contacts K101A2 in the energizing circuit for the solenoid L101 (FIG. 14). As previously described, the solenoid L101 controls the vacuum valve 159 (FIG. 2) and causes vacuum pressure to be applied from the pump 46 to the cylinders 134, to cause the topmost ledger card 33 of the stack on the table 60 to be brought into frictional engagement with said cylinders. It will be recalled that a constant air stream is provided through apertures in the tubes 131 and 132 (FIG. 4) to flutter the edges of the topmost cards 33 of the stack on the table 60, to facilitate the movement of the top card into engagement with the cylinders 134.

Rotation of the cylinders 134 moves the card 33 to the right, as shown in FIGS. 2 and 4, into engagement with the cooperating sets of feed and pressure rollers, such as 175, 177, and 176, 178. These sets of cooperating feed rollers and pressure rollers effect continued movement of the card 33 to the right, so that the leading edge of the card strikes the feeler 207 on the switch 205, which operates the contacts of the switch 205, causing the contacts SC101A1 to close. Closing of the contacts SC101A1 completes an energizing circuit for the relay K104, energizing said relay and thereby causing the contacts K104BC2 to open and interrupt the energizing circuit for the solenoid L101. Deenergization of the solenoid L101 causes the vacuum control valve 159 to close, interrupting the vacuum to the cylinders 134.

Energization of the relay K104 also closes the contacts K104A3 (FIG. 13) to complete the circuit to the indicating bulb I101, causing said bulb, positioned behind the aperture 317 in the board 315 (FIG. 12), to be illuminated.

In addition, the relay K104, when energized, causes the contacts K104AC2 to close, to complete an energizing circuit for the eject solenoid L102. This circuit has previously been prepared by closing of the relay contacts K101A3, which were closed at the time the relay K101 energized. In the case of the first ledger card being fed to the accounting machine, operation of the eject solenoid L102 has no significance, since no card is in the accounting machine at that time to be ejected. However, with each succeeding card, the control of ejection from the accounting machine of the card which has been operated upon is effected by the energization of the solenoid L102, described above. It will be noted that while the operation of the eject solenoid L102 is directly effected under control of the feeder, this control in turn is dependent upon the operation of the accounting machine, since the energization of the relay K101 is dependent upon the application of power from the accounting machine circuitry to the point 340 in the energizing circuit of said relay. Power is applied through the operating circuitry of the accounting machine to the point 340 at the time the accounting machine is prepared by its condition to accept another ledger card from the feeding device. Therefore, if the accounting machine is not in proper condition to accept another card from the feeding device, power will not be applied to the point 340 and the relay K101 will not energize, so that initiation of operation of the feeding device 31 will not take place.

A detailed description of the manner in which the eject solenoid L102 functions to retrieve the ledger card from the accounting machine after completion of operation of the accounting machine upon said card will be subsequently taken up in the discussion of the manner of ejection of the card from the accounting machine, and its placement in one of the two bins or receptacles 44 and 45 of the feeding device.

As the card 33 is fed to the right, as viewed in the figures of the drawings, toward the accounting machine 32, the leading edge of said card strikes the feeler 208 of the switch 206, closing the contacts SC102AC1, and thereby energizing the relay K102. Energization of the relay K102 causes a holding circuit to be completed for said relay to hold it in energized condition, and also closes the relay contacts K102A2 in the energizing circuit for the relay K103 to prepare said energizing circuit. Then, as the trailing edge of the card 33 passes the feeler 208 of the switch 206, the contacts SC102AC1 are opened. However, the relay K102 is not deenergized, since it is now held over the circuit containing the relay contacts K102A1. The contacts SC102BC1 are closed by this movement of the feeler 208, thus completing the energizing circuit for the relay K103.

Energization of the relay K103 causes closing of the contacts K103A1 in FIG. 16, in the circuit extending between points 349 and 350 in the balance pickup circuit (not shown) of the accounting machine. It should be noted at this point that the relay contacts K105A1 in this circuit will be closed, and the relay contacts K107B3 will be opened, since positioning of the switch 333 of the board 315 to "transfer" position closes the contacts ST104A1 in the energizing circuit for the relay K107 of FIG. 15, thus energizing the relay K107, which in turn causes the contacts K107A1 in the energizing circuit for the relay K105 to be closed, so that relay K105 is energized by power applied to the point 346 from the operating circuitry of the accounting machine at the time said accounting machine is prepared to commence a pickup cycle. The operating circuit of FIG. 16 is thus completed over the contacts K103A1 to initiate a balance pickup operation of the accounting machine when the trailing edge of the card 33 passes the feeler 208 of the switch 206.

The construction and operating circuitry of the accounting machine are such that the contacts K303B3 (FIG. 15) in the holding circuit for the relay K102 are opened by completion of the circuit between points 349 and 350 of FIG. 16. Opening of the contacts K303B3 deenergizes the relay K102. This in turn causes opening of the contacts K102A2 in the energizing circuit for the relay K103, thereby deenergizing the relay K103. When the relay K103 is deenergized, the contacts K103A1 in FIG. 16, which were closed to condition the accounting machine for a cycle of operation, are opened to trip the accounting machine for the cycle of operation for which it had been conditioned by the closing of these contacts. The closing and subsequent reopening of the relay contacts K103 corresponds to the depression and release of an operating bar on the accounting machine, which is used to trip the machine for operation when said machine is being operated manually.

Referring to FIG. 10, the pins, such as 237, which engage the card 33 when it is fed into the accounting machine to hold said card in proper position on the carriage table, were withdrawn from the position in which they are shown in FIG. 10, to a retracted position, at the time that the accounting machine was turned on by depression of the switch 329. This was accomplished by energization of the gripper solenoid (not shown), which drew said pins, and the arms to which they are attached, out of the position in which they are shown in FIG. 10. When the relay contacts K103A1 closed to complete the circuit between points 349 and 350 in FIG. 16, the gripper solenoid was deenergized to permit said studs to return to the position in which they are shown in FIG. 10, and to thus captivate the card 33 which had been fed from the feeder 31 into engagement with the guide 234.

In the event that the card 33 is correctly positioned, so that the studs move through the holes in said card to the full extent of their movement, the arm 246, working through the stud 247 and the actuator 251, causes the contacts of the switch 248 to be operated. Certain contacts of this switch (not shown) in the operating circuit of the accounting machine close to permit the accounting machine to commence a cycle of operation upon opening of the contacts K103A1 of FIG. 16.

In addition, the contacts SC9BC1 (FIG. 15) of the switch 248 open, in the event that the card 33 is properly positioned in the accounting machine, to interrupt the holding circuit for the energization of the relay K104, thereby deenergizing said relay. Deenergization of the relay K104 causes the contacts K104BC2 (FIG. 14) in the energizing circuit for the vacuum solenoid L101 to close, thus preparing said energizing circuit for operation upon energization of the relay K101 under influence of the operating circuit of the accounting machine connected to point 340. Deenergization of this relay also causes the contacts K104A3 (FIG. 13) to open, thus extinguishing the indicator bulb I101.

In the event that the card 33 is not properly positioned on the carriage table 235 of the accounting machine, the previously-mentioned accounting machine contacts in the switch 248 will not close to initiate an operating cycle of the accounting machine. Also, the contacts SC9BC1 in FIG. 15 will not open. This means that the relay K104 will be maintained in an energized condition, thus holding the relay contacts K104BC2 in the energizing circuit for the vacuum solenoid L101 open to prevent energization of said solenoid, and thereby to prevent the initiation of feeding of another card 33 by the feeder 31. Also, the contacts K104A3 (FIG. 13) in the circuit for the light bulb I102 will remain closed, so that said bulb will remain lighted to indicate that the card 33 is improperly positioned.

If, however, as first assumed, the card 33 is correctly positioned, so that the switch 248 is actuated, then the accounting machine will perform a balance pickup operation and, when concluded, will apply power once more to point 340 in the energizing circuit for the relay K101 (FIG. 15).

In the event that information is not properly picked up from the card 33 from any one of the magnetically coded areas, power is applied from the pawl check failure circuit in the accounting machine to the point 347 (FIG. 15) to energize the relay K108. This causes the contacts K108A1 in the energizing circuit of the relay K106 to close and energize said relay, since the accounting machine contacts K318A4 are also closed at this time. Energization of the relay K106 causes the contacts K106A2 (FIG. 13) to close, applying power to the indicating bulb I102, to light said bulb and thus indicate a pawl check failure. Also, energization of this relay causes the contacts K106B1 (FIG. 15) in the energizing circuit of the relay K101 to open, thereby preventing the feeding of another card 33 by the feeder.

When the accounting machine has completed its operating cycle, power is applied to point 340 in the energizing circuit for the relay K101. This causes energization of the vacuum solenoid L101, as previously described, to initiate feeding of another card into the accounting machine, and also prepares the energizing circuit for the eject solenoid L102 by closing the contacts K101A3 in that circuit. Then, as the leading edge of the card 33 being fed into the accounting machine operates the feeler 207, the contacts SC101A1 are closed to energize the relay K104. This closes the contacts K104AC2 in the energizing circuit for the solenoid L102 to energize said solenoid. As has been previously described, energization of the solenoid L102 causes the fingers 285 (FIG. 10) to be shifted in a clockwise direction to move the leading portion of the card, which has been released by the accounting machine, on completion of its operation thereon, into engagement with the lower portion of the feed rollers 176. The frictional engagement of the card with these rollers results in the movement of said card by said rollers in a direction to the left, as shown in FIG. 2, around the guides 293, and past the additional feed rollers 295 and 296, which keep the card moving in the desired direction. Since the condition of the fingers 301 has been set at this time by the condition of the transfer solenoid L103, the card is diverted into whichever bin 44 or 45 it is desired that the card should be sorted into, according to the signal applied or not applied to the point 346 in the energizing circuit for the relay K105 from the accounting machine.

The condition of the transfer solenoid L103 is determined by the accounting machine during its cycle of operation, slightly before said cycle is completed. The solenoid L103 controls the sorting function of the feeder, determining whether the cards ejected from the accounting machine will be sorted into the upper bin 44 or the lower bin 45 of the feeder, by control of the fingers 301 by said solenoid, as previously explained. If it is desired that the card ejected by the accounting machine should be sorted into the upper bin 44 of the feeder, the solenoid L103 is not energized, while, if the card is to be sorted into the lower bin 45, the solenoid L103 is energized. As previously explained, energization of the solenoid L103 may be controlled by the condition of the relay contacts K105A3. The condition of these relay contacts, in turn, is controlled, in a transfer operation, by the application of power to the point 346 in the energizing circuit for the relay K105. The operation of the accounting machine on the first and every alternate card during a transfer operation is such that power is not applied to the point 346 to cause energization of the relay K105, closing of the contacts K105A3, and consequent energization of the solenoid L103. Therefore, the first and every alternate card (the odd-numbered cards) operated upon during a transfer operation will be sorted into the upper bin 44 of the feeder.

The second, and every other alternate card—that is, the even-numbered cards, taken in the order of their being fed to the accounting machine—are to be sorted into the lower bin 45 of the feeder. Therefore, when these cards are operated upon by the accounting machine, near the end of the operating cycle of the machine, power is applied through operating circuitry in the accounting machine to the point 346, to energize the relay K105, the contacts K107A1 being closed during a transfer operation. Therefore, the contacts K105A3 will be closed to energize the solenoid L103 and cause these cards to be sorted into the lower bin 45 of the feeder.

In the same manner as described above, successive cards 33 are fed from the stack on the table 60 into the accounting machine, operated upon, ejected from the accounting machine, and sorted into the appropriate bins during a transfer operation. As has been previously described, the table 60 is automatically elevated the proper amount so that the top card 33 of the stack on said table is always in the correct position to be picked up by the cylinders 134 for feeding into the accounting machine.

For proper operation of the feeder in transferring accounts from one ledger card to another, provision must be made for automatically causing a new balance operation of the accounting machine to follow each balance pickup operation of the accounting machine, as well as for causing a balance pickup operation of the machine to follow each new balance operation. This is controlled by the transfer relay K105, and at the end of a balance pickup operation the relay K105 is deenergized, so that the contacts K105B2 of FIG. 17 are closed, and the contacts K105A1 of FIG. 16 are opened. The operating circuit of FIG. 16 is thus disabled, and the operating circuit of FIG. 17, which is utilized to trip the accounting machine for a new balance operation, is prepared. Also, the contacts K107A4 in FIG. 17 are closed, while the contacts K107B3 in FIG. 16 are opened, due to the fact that the relay K107 has been energized by closing of the contacts ST104A1 through positioning of the switch 333 on the board 315 to "transfer" position. It will be recalled that, as the card being fed from the feeder to the accounting machine passes the feeler 208, the contacts SC102AC1 in the energizing circuit for the relay K102 are closed, thereby energizing said relay. This closes the contacts K102A2 to prepare the energizing circuit for the relay K103. Now, as the trailing edge of the card 33 passes the feeler 208 to permit said feeler to return to the position in which it is shown in FIG. 8, the contacts SC102BC1 close to energize the relay K103. This closes the contacts K103A2 of FIG. 17 and trips the accounting machine for a new balance operation.

When it is desired to perform a trial balance operation rather than a transfer operation, the switch 333 on the board 315 (FIG. 12) is moved to its upper or "post and trail balance" position. This causes the contacts ST104A1 in the energizing circuit for the relay K107 to be opened, thereby preventing the deenergization of the relay K107. In this case, energization of the relay K105 is also prevented, since the normally open contacts K107A1 in the energizing circuit for the relay K105 remain open. The new balance initiating circuit of FIG. 17 is thereby disabled from any operation, since the relay contacts K107A4 in this circuit remain open. In the circuit of FIG. 16, the relay contacts K107B3 remain closed, so that this circuit is completed whenever the relay contacts K103A1 close. It will, therefore, be seen that with the switch 333 in its "post and trial balance" position, every operation of the accounting machine is a balance pickup operation. The feeder and the accounting machine then operate, utilizing the balance pickup circuit of FIG. 16, in the same manner as has been described for the balance pickup operations performed in transfer operations. In the trial balance operations, however, each operation, rather than every other operation, is a balance pickup operation.

With the switch 333 in "post and trial balance" position, the transfer solenoid L103 cannot be energized through the relay contacts K105A3, since these contacts remain open all during a trial balance operation. Therefore, the transfer solenoid L103 must be energized through closing of the alternate path, which includes contacts 367, ST103A1, and K107B2. In a trial balance operation, the contacts K107B2 will normally be closed, and the contacts ST103A1 may be closed by proper positioning of the switch 332 to its upper "sort" position. Energization of the solenoid L103 is thus controlled by the condition of the contacts 367, which, as has been described, are operated by the overdraft mechanism of the accounting machine, so that said contacts are closed whenever the accounting machine is in overdraft condition. Therefore, whenever an overdraft balance is picked up by the accounting machine from a ledger card, the contacts 367 are closed, to energize the solenoid L103. This operates through the linkage described previously to cause that ledger card to be sorted into the lower bin 45 of the feeder. If it is desired to have all of the cards sorted into a single bin, regardless of their condition, the contacts ST103A1 may be opened by movement of the switch 332 on the board 315 from its "sort" position to its "no-sort" position. In this case, the solenoid L103 is completely disabled from energization, since both of the energizing paths are disabled.

It will be noted that the upper position of the switch 333 on the board 315 is termed "post and trial balance." In addition to being used for trial balance operations, this upper position may be used for posting operations when an automatic input device is connected to the accounting machine in such a manner as to control the accounting machine for automatic entry of check and deposit information for each account. Such a mechanism is not disclosed herein and forms no part of the present invention.

In certain instances, it may be desirable to provide manual controls for certain operations of the feeder and the accounting machine rather than being completely dependent upon the operating circuitry which provides for automatic operation. To this end, the switches 322, 323, and 324 on the board 315 have been provided. The switch 322 enables manual initiation of a feeding operation by the feeder, by causing the contacts SP101A1 to be closed whenever this switch is depressed. This provides direct energization of the vacuum solenoid L101, to supply vacuum pressure to the cylinders 134 and thus pick up the topmost card of the stack on the table 60 and commence the feeding of this card into the accounting machine. Similarly, manual ejection of a card which has been released by the accounting machine may be accomplished by depression of the switch 323, which closes the contacts SP102A1 and thus directly energizes the eject solenoid L102 to cause the fingers 285 to press the leading portion of the card into engagement with the feed rollers 176 to feed said card out of the accounting machine and into one of the bins 44 or 45 of the feeder. Also, if it is desired manually to initiate a pickup operation of the accounting machine, this may be accomplished by depression of the switch 324, which closes the contacts SP103A1 to provide completion of the circuit of FIG. 16 between points 349 and 350 in the operating circuitry of the accounting machine.

While the form of mechanism shown and described herein is admirably adapted to fulfill the objects primarily stated, it is to be understood that it is not intended to confine the invention to the one form of embodiment disclosed herein, for it is susceptible of embodiment in various other forms, within the scope of the appended claims.

What is claimed is:

1. A record member feeding device for use in conjunction with a utilizing device comprising, in combination, constantly rotating feeding means for feeding record members to the utilizing device; advancing means for advancing a record member from an initial position to the feeding means; solenoid means for controlling operation of the advancing means; first switching means controlled by the utilizing device to energize said solenoid means; second switching means under manual control to energize said solenoid means independently of the utilizing device; and third switching means operated by the record member for deenergizing the solenoid means to terminate the operation of the advancing means when the record member is advanced into engagement with the feeding means.

2. The record member feeding device of claim 1, also including further switching means for preventing energization of the solenoid means when the utilizing device fails to function properly in picking up information from the previous record member.

3. The record member feeding device of claim 1, also including visual indication means to provide a signal when the utilizing device fails to function properly in picking up information from the record member.

4. The record member feeding device of claim 1, also including further switching means for preventing energization of the solenoid means when the previous record member is improperly positioned in the utilizing device.

5. The record member feeding device of claim 1, also including visual indication means to provide a signal when the record member is improperly positioned in the utilizing device.

6. A record member feeding device for use in conjunction with a utilizing device comprising, in combination, constantly rotating feeding means for feeding record members to the utilizing device; means for elevating record members to an initial position; advancing means for advancing a record member along a substantially horizontal path from said initial position to the feeding means; an actuating solenoid for initiating operation of the advancing means; a control relay for controlling the operation of the actuating solenoid in response to a signal from the utilizing device; manually operable disabling means for disabling the control relay; and further manually operable means capable of controlling the operation of said actuating solenoid when said control relay is disabled by said disabling means.

7. A record member feeding device for use in conjunction with a utilizing device comprising, in combination, constantly rotating feeding means for feeding record members to the utilizing device; means for elevating record members to an initial position; advancing means for advancing a record member along a substantially horizontal path from said initial position to the feeding means; an actuating solenoid for initiating operation of the advancing means; a control relay for controlling the operation of the actuating solenoid in response to a signal from the utilizing device; and manually operable disabling means for disabling the control relay.

8. A record member feeding device for use in conjunction with a utilizing device, comprising, in combination, constantly rotating feeding means for feeding record members to the utilizing device; at least one constantly rotating apertured cylinder connected to a source of vacuum pressure for advancing a record member from an initial position to the feeding means; valve means for controlling the vacuum pressure applied to the rotating cylinder; solenoid means for operating the valve means, energization of said solenoid means being effective to cause the valve means to apply vacuum pressure to said cylinder to bring a record member, by means of said pressure acting through the apertures in said cylinder, into engagement with the cylinder for advancing said record member to the constantly rotating feeding means; first relay means for controlling the energization of said solenoid means; first manually operable switching means for controlling the operation of said first relay means; second switching means for controlling the operation of said first relay means, and capable of preventing operation of said first relay means when the utilizing device fails to function properly in picking up information from the previous record member; second relay means for controlling the energization of said solenoid means and capable of deenergizing said solenoid means when operated, said first and second relay means being connected serially with said solenoid means; third switching means controlled by movement of the record member and capable of operating said second relay means to deenergize said solenoid means when the record member has been advanced to the constantly rotating feeding means; and fourth manually operable switching means connected in parallel with the serial combination of the first and second relay means for by-passing said relay means to enable energization of the solenoid means regardless of the condition of said first and second relay means, whereby said cylinder can be made effective to advance a record member from an initial position to the feeding means.

9. A record member feeding device for use in conjunction with a utilizing device, comprising, in combination, constantly rotating feeding means for feeding record members to the utilizing device; at least one constantly rotating apertured cylinder connected to a source of vacuum pressure for advancing a record member from an initial position to the feeding means; valve means for controlling the vacuum pressure applied to the rotating cylinder; solenoid means for operating the valve means, energization of said solenoid means being effective to cause the valve means to apply vacuum pressure to said cylinder to bring a record member, by means of said pressure acting through the apertures in said cylinder, into engagement with the cylinder for advancing said record member to the constantly rotating feed means; first switching means controlled by the utilizing device to energize said solenoid means; second manually operable switching means to energize said solenoid means independently of the utilizing device; and third switching means controlled by movement of the record member to deenergize said solenoid means to cause the valve means to terminate vacuum pressure to said cylinder when the record member has been advanced to the constantly rotating feed means.

10. A record member feeding device for feeding record members to a utilizing device, comprising, in combination, constantly operating feeding means for carrying record members to the utilizing device; means for delivering record members one at a time to the feeding means; first switching means arranged to be actuated when the leading edge of the record member passes a given point; conditioning means for conditioning the utilizing device for operation when the first switching means is actuated; second switching means arranged to be actuated when the trailing edge of said record member passes said given point; and initiating means for initiating operation of the utilizing device, said initiating means being controlled by the condtioning means and the second switching means to cause initiation of operation of the utilizing device when the trailing edge of said record member passes said given point.

11. A record member feeding device for use in conjunction with a utilizing device and capable of feeding record members to said device and retrieving them therefrom, comprising, in combination, at least one constantly operating feeding roll for transporting the record members; first engaging means operable to maintain a record member in engagement with the upper surface of said feeding roll to enable transport of the record member in a first direction by the feeding roll into the utilizing device; second engaging means operable to shift a record member which has been released from the utilizing device into frictional engagement with the lower surface of the feeding roll to cause said record member to be retrieved in a second direction from said utilizing device; solenoid means to operate selectively the second engaging means; first control means to operate the solenoid means in response to a signal from the utilizing device when the record member is released therefrom; second control means to operate the solenoid means under manual control; a plurality of receptacles associated with the feeding device and arranged to receive record members retrieved from the utilizing device; selecting means for controlling the movement of each retrieved record member to direct it into a selected one of the receptacles; solenoid means to operate the selecting means; first sort control means to operate the solenoid means in response to a signal from the utilizing device; and second sort control means to operate the solenoid means under manual control.

12. A record member feeding device for use in conjunction with a utilizing device and capable of feeding record members to said device and retrieving them therefrom, comprising, in combination, at least one constantly operating feeding roll for transporting the record members; first engaging means operable to maintain a record member in engagement with the upper surface of said feeding roll to enable transport of the record member in a first direction by the feeding roll into the utilizing device; second engaging means operable to shift a record member which has been released from the utilizing device into frictional engagement with the lower surface of the feeding roll to cause said record member to be retrieved in a second direction from said utilizing device; control means to operate the second engaging means in response to a signal from the utilizing device when the record member is released therefrom; a plurality of receptacles associated with the feeding device and arranged to receive record members retrieved from the utilizing device; selecting means for controlling the movement of each retrieved record member to direct it into a selected one of the receptacles; and sort control means to operate the selecting means in response to a signal from the utilizing device.

13. A record member feeding device for use in conjunction with a utilizing device, comprising, in combination, feeding means for feeding record members to the utilizing device; first circuit means for causing the utilizing device to perform one type of operation; second circuit means for causing the utilizing device to perform another type of operation; manually operable selecting means for conditioning a selected one of the first and second circuit means for operation; first switching means controlled by feeding movement of a record member and arranged to be actuated when the leading edge of the record member passes a given point; second switching means controlled by feeding movement of a record member and arranged to be actuated when the trailing edge of the record member passes a given point; and relay means controlled by said first and second switching means and operable when energized to initiate operation of said utilizing device by completing whichever of the two circuit means has been conditioned for operation by the selecting means.

14. A record member feeding device for use in conjunction with a utilizing device, comprising, in combination, feeding means to feed record members to the utilizing device; advancing means operable to advance a record member into operative association with the feeding means; solenoid means to control the operation of the advancing means; retaining means in the utilizing device to accept and retain the record member fed thereto by the feeding means; relay means operable to control the solenoid means to terminate operation of the advancing means; and switching means controlled by the retaining means to retain the relay means in operative condition to prevent operation of the advancing means until the record member is accepted by the utilizing device, to prevent more than one record member from being fed to the utilizing device at one time.

(References on following page)

References Cited in the file of this patent

UNITED STATES PATENTS

| | | |
|---|---|---|
| 1,691,963 | Dexter | Nov. 20, 1928 |
| 2,085,612 | Spiess | June 29, 1937 |
| 2,086,577 | Reinartz | July 13, 1937 |
| 2,165,231 | Curtis | July 11, 1939 |
| 2,222,076 | Kahn | Nov. 19, 1940 |
| 2,313,100 | Stevens | Mar. 9, 1943 |
| 2,413,875 | Lang | Jan. 7, 1947 |
| 2,493,858 | Carroll | Jan. 10, 1950 |
| 2,533,309 | Blakely | Dec. 12, 1950 |
| 2,615,626 | Luhn | Oct. 28, 1952 |
| 2,708,514 | Maul | May 17, 1955 |
| 2,743,921 | Spreckelmeier | May 1, 1956 |
| 2,804,974 | Noon | Sept. 3, 1957 |
| 2,889,110 | Johnson | June 2, 1959 |
| 2,906,400 | Newcomb | Sept. 29, 1959 |
| 2,914,320 | Petre | Nov. 24, 1959 |

UNITED STATES PATENT OFFICE
CERTIFICATE OF CORRECTION

Patent No. 3,079,145 February 26, 1963

Henry Grosnickle, Jr., et al.

It is hereby certified that error appears in the above numbered patent requiring correction and that the said Letters Patent should read as corrected below.

Column 6, line 74, for "ptiman" read -- pitman --; column 7, line 24, for "tthe" read -- the --; column 13, line 29, for "came" read -- cam --; line 47, after "this" insert -- time --; column 14, line 26, for "The" read -- These --; column 17, line 7, for "compleete" read -- complete --; line 56, for "denergize" read -- deenergize --; column 21, line 18, for "1101, 1102, 1103, and 1104" read -- I101, I102, I103, and I104 --; column 22, line 11, for "deposite" read -- deposite --; column 26, line 55, for "trail" read -- trial --; column 29, line 57, for "condtioning" read -- conditioning --.

Signed and sealed this 17th day of September 1963.

SEAL)
Attest:

ERNEST W. SWIDER
Attesting Officer

DAVID L. LADD
Commissioner of Patents